US012669197B1

(12) United States Patent
    Lundstrom et al.

(10) Patent No.: US 12,669,197 B1
(45) Date of Patent: Jun. 30, 2026

(54) GRIPPING WEDGE FOR PIPE JOINT RESTRAINT

(71) Applicant: EBAA Iron, Inc., Eastland, TX (US)

(72) Inventors: Michael L. Lundstrom, Eastland, TX (US); Nathan Kidd, Eastland, TX (US)

(73) Assignee: EBAA Iron, Inc., Eastland, TX (US)

( * ) Notice: Subject to any disclaimer, the term of this patent is extended or adjusted under 35 U.S.C. 154(b) by 0 days.

(21) Appl. No.: 19/270,608

(22) Filed: Jul. 16, 2025

Related U.S. Application Data

(60) Provisional application No. 63/807,220, filed on May 16, 2025, provisional application No. 63/677,017, filed on Jul. 30, 2024.

(51) Int. Cl.
    *F16L 21/00* (2006.01)
    *F16L 21/06* (2006.01)
    *F16L 25/06* (2006.01)
    *F16L 37/15* (2006.01)

(52) U.S. Cl.
    CPC .......... *F16L 21/007* (2013.01); *F16L 21/065* (2013.01); *F16L 25/065* (2013.01); *F16L 37/15* (2013.01)

(58) Field of Classification Search
    CPC ....... F16L 37/15; F16L 25/065; F16L 21/007; F16L 21/04
    USPC .................................................. 285/342, 343
    See application file for complete search history.

(56) References Cited

U.S. PATENT DOCUMENTS

| | | | |
|---|---|---|---|
| 2,474,880 A | | 7/1949 | Woodling |
| 3,963,366 A | | 6/1976 | Eckle et al. |
| 4,664,426 A | * | 5/1987 | Ueki ........................ F16L 21/08 |
| | | | 285/343 |
| 5,071,175 A | | 12/1991 | Kennedy, Jr. |
| 6,173,993 B1 | | 1/2001 | Shumard et al. |
| 6,851,728 B2 | * | 2/2005 | Minami ................. F16L 19/086 |
| | | | 285/342 |
| 6,869,109 B2 | | 3/2005 | Matsushita |
| 7,484,775 B2 | * | 2/2009 | Kennedy, Jr. ........... F16L 21/04 |
| | | | 285/342 |
| 2011/0291409 A1 | | 12/2011 | Kennedy, Jr. et al. |

FOREIGN PATENT DOCUMENTS

EP           0205896  B1    12/1986

* cited by examiner

*Primary Examiner* — David Bochna
(74) *Attorney, Agent, or Firm* — HAYNES AND BOONE, LLP

(57) ABSTRACT

A gripping wedge adapted to be received within a housing of a pipe joint restraint and contacted by a torque screw to set the gripping wedge against a pipe restrained by the pipe joint restraint. The gripping wedge defines first, second, and third planes, each of which is perpendicular to others, and includes a projection, a groove, and a ledge. The projection is curved in the first and third planes and is adapted to dig into and grip the pipe. The groove is curved in the first and second planes and is adapted to receive material of the pipe displaced by the projection. The groove may also be curved in the third plane. The ledge is contacted by the torque screw, which imparts a downward force on the gripping wedge. The ledge may be inclined to facilitate improved application of the downward force on the gripping wedge.

20 Claims, 30 Drawing Sheets

GRIPPING WEDGE FOR PIPE JOINT RESTRAINT

CROSS-REFERENCE TO RELATED APPLICATIONS

This application claims the benefit of the filing date of, and priority to, U.S. Patent Application No. 63/677,017, filed Jul. 30, 2024, the entire disclosure of which is hereby incorporated herein by reference.

This application also claims the benefit of the filing date of, and priority to, U.S. Patent Application No. 63/807,220, filed May 16, 2025, the entire disclosure of which is hereby incorporated herein by reference.

FIELD OF THE DISCLOSURE

The present disclosure relates, in general, to joint restraints, and more particularly, to gripping wedges for joint restraints that increase the grip of the joint restraint with respect to pipes joined together using the joint restraint.

BACKGROUND

Some joint restraints known in the art are used to connect, seal, and prevent the disengagement of axially aligned pipes. In some applications, a first pipe is received within a second pipe having an enlarged mouth, a packing cavity, and a terminal flange. In other applications, the first pipe may not be received within the second pipe, but a first end of the first pipe may be positioned adjacent and axially aligned with a first end of the second pipe. In use, the joint restraint is connected to both the outer surface of the first pipe and the terminal flange of the second pipe, so as to hold the two pipes together.

A wedge assembly of the joint restraint facilitates the connection of the two pipes by gripping the first pipe. A gripping wedge of the wedge assembly contacts an outer surface of the first pipe. In the course of gripping a variety of types of pipes for the purpose of restraining the joint, it is desirable to penetrate a radially outer surface of the first pipe with a tooth-like projection extending from a surface of the gripping wedge adjacent to the outer surface of the first pipe. In penetrating the outer surface of the first pipe, an axial restraining force is transferred to the outer surface of the first pipe in a manner of mechanical interference creating shear.

During activation of the wedge assembly, the tooth-like projection of the gripping wedge cuts, or pushes, a groove into the outer surface of the first pipe and the embedded tooth provides positive anchorage and transfer of force resisted by the material shear strength of the first pipe. As a result of forming the groove in the first pipe, material of the first pipe previously occupying the space of the groove is displaced. The material is generally displaced upward and forward. This displaced material has historically created an interference issue between the gripping wedge and the first pipe, reducing the effectiveness of the gripping wedge in gripping the first pipe.

Furthermore, once a screw of the wedge assembly has been torqued to initially set the wedge against the surface of the pipe, no additional downward force is provided to maintain the tooth of the wedge in contact with the surface of the pipe during activation. Maintaining the downward force or pressure applied by the set screw has proven to be challenging. As pressure in the pipes increases or spikes during operation of the piping system and the pipes are accordingly urged to separate as a result of the increased pressure, the wedge tooth has been known to jump, rotate, or be impacted out of the wedge groove, compromising the ability of the gripping wedge and the joint restraint to grip the pipe.

Finding a balance between creating sufficient shear force via gripping wedge penetration, while also not overly penetrating, puncturing, or otherwise damaging the pipe being restrained, has proven to be particularly challenging for manufacturers of joint restraints. The present disclosure addresses one or more shortcomings of the prior art.

DETAILED DESCRIPTION

Figure 1:
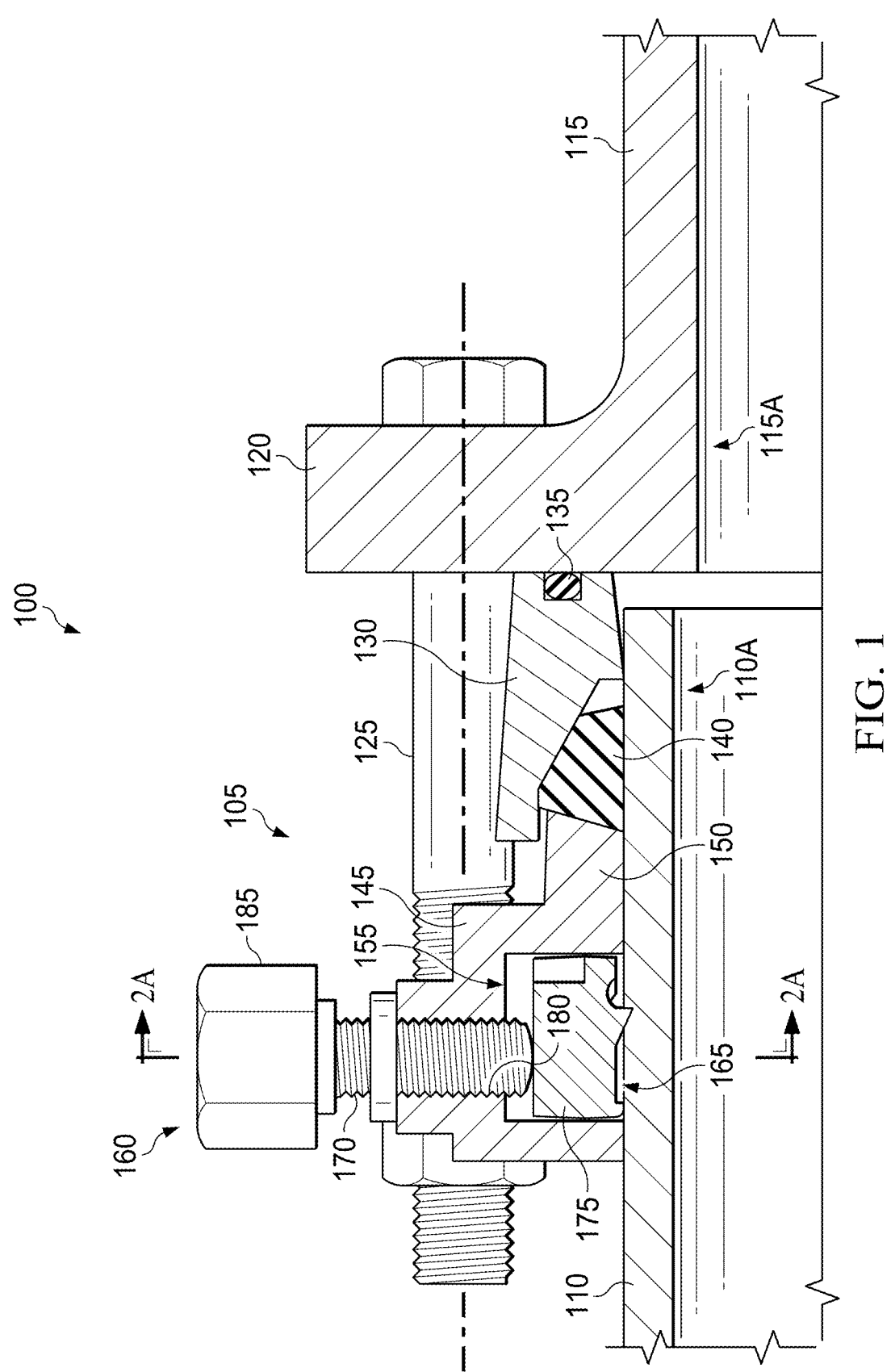
FIG. 1 illustrates a cross-sectional view of a pipe junction system including a joint restraint, the joint restraint including a gripping wedge, according to one or more embodiments of the present disclosure.

The following disclosure provides many different embodiments. Specific examples of components and arrangements are described below to simplify the present disclosure. These are, of course, merely examples and are not intended to be limiting. In addition, the present disclosure may repeat reference numerals and/or letters in the various embodiments. This repetition is for the purpose of simplicity and clarity and does not in itself dictate a relationship between the various embodiments and/or configurations discussed.

FIG. 1 illustrates a joint restraint system 100, according to one or more embodiments of the present disclosure. In one or more embodiments, the joint restraint system 100 includes a joint restraint 105, a first pipe 110, and a second pipe 115, the joint restraint 105 being configured to operably couple the first pipe 110 and the second pipe 115 to facilitate pressurized fluid flow therebetween. In one or more embodiments, the first pipe 110 is received through the joint restraint 105 such that the joint restraint 105 is mounted on the first pipe 110. In the embodiment shown, a first end portion 110A of the first pipe 110 is positioned adjacent and coaxially aligned with a first end portion 115A of the second pipe 115 so that the respective ends of the first pipe 110 and the second pipe 115 can be operably coupled by the joint restraint 105. In one or more other embodiments, the first end portion 110A of the first pipe 110 is received within and coupled to the first end portion 115A of the second pipe 115. In one or more embodiments, the first pipe 110 may be a pipe, a pipe joint, a pipe junction, or a pipe fitting. In one or more embodiments, the second pipe 115 may be a pipe, a pipe joint, a pipe junction, or a pipe fitting. In one or more embodiments, the first pipe 110 and/or the second pipe 115 may be made of metal, plastic, such as, for example, polyvinyl chloride (PVC), or another suitable material as desired or required for a particular application.

In one or more embodiments, the second pipe 115 includes an annular flange 120 located at the first end portion 115A of the second pipe 115. In one or more embodiments, the annular flange 120 is configured to facilitate attachment of the joint restraint 105 to the second pipe 115 via a plurality of fasteners 125 and thus facilitate the coupling, fluidically, of the first pipe 110 and the second pipe 115.

In one or more embodiments, the joint restraint system 100 further includes a restraint ring 130 positioned axially between the annular flange 120 of the second pipe 115 and the joint restraint 105 to facilitate a secure seal between the first pipe 110 and the second pipe 115. In one or more embodiments, the restraint ring 130 includes a gasket ring 135 positioned within an annular groove 205 located in the restraint ring 130. In one or more embodiments, the gasket ring 135 seals the restraint ring 130 against the annular flange 120 of the second pipe 115 at the first end of the second pipe 115. In one or more embodiments, the first end of the first pipe 110 is received through the restraint ring 130, similar to the joint restraint 105, such that the restraint ring 130 extends circumferentially about the first end of the first pipe 110.

In one or more embodiments, the joint restraint system 100 further includes a packing material 140 received within the restraint ring 130 and positioned radially between first pipe 110 and the restraint ring 130 such that the packing material 140 provides a seal and facilitates sealing engagement between the first pipe 110 and the restraint ring 130, and ultimately facilitates the sealing engagement between the first pipe 110 and the second pipe 115. In one or more embodiments, where the first end of the first pipe 110 is received within the first end of the second pipe 115, the joint restraint system 100 may not include the restraint ring 130, and the packing material 140 may be positioned directly and radially between the first end of the first pipe 110 and the second end of the second pipe 115 to seal and facilitate sealing engagement of the first pipe 110 and the second pipe 115.

In one or more embodiments, the joint restraint 105 includes a substantially annular body 145, an annular projection 150, a plurality of wedge assembly housings 155, and a plurality of wedge assemblies 160. In one or more embodiments, the plurality of wedge assembly housings 155 extend into the annular body 145 and are distributed equally and circumferentially about the annular body 145. In one or more embodiments, each wedge assembly housing 155 includes an open mouth 165 that extends radially into a least a portion of the respective wedge assembly housing 155 from a radially inner surface of the annular body 145 of the joint restraint 105 such that each respective open mouth 165 faces, or is adjacent to, the first pipe 110 when the joint restraint 105 is installed on the first pipe 110. In one or more embodiments, each wedge assembly housing 155 of the plurality of wedge assembly housings 155 is configured to receive at least a portion of a wedge assembly 160 of a plurality of wedge assemblies 160. In one or more embodiments, each wedge assembly housing 155 of the plurality of wedge assembly housings 155 is configured to receive the at least a portion of a wedge assembly 160 of a plurality of wedge assemblies 160 via each respective open mouth 165.

In one or more embodiments, when the joint restraint 105 is mounted on the first pipe 110, the annular body 145 may be rotated and oriented such that a plurality of holes of the joint restraint 105 are axially aligned, and adapted to cooperate with, a plurality of holes of the annular flange 120 of the second pipe 115 such that each respective pair of aligned holes is adapted to receive a fastener of the plurality of fasteners 125. In one or more embodiments, as the joint restraint 105 is connected to the annular flange 120 of the second pipe 115 via assembly of the plurality of fasteners 125, the annular projection 150 of the joint restraint 105 pushes against the packing material 140 and securely and tightly packs the packing material 140 between the restraint ring 130 and the first pipe 110, or into a gap between the first pipe 110 and the second pipe 115 in embodiments where the first end of the first pipe 110 is received within the first end of the second pipe 115, thus creating the seal between the restraint ring 130 and the first pipe 110, or between the first pipe 110 and the second pipe 115, respectively.

In one or more embodiments, each wedge assembly 160 includes a torque screw 170 and a gripping wedge 175. The gripping wedge 175 may also be referred to as a pipe pressing member. In one or more embodiments, the torque screw 170 may include a threaded shank that is threaded into the annular body 145 of the joint restraint 105 through a threaded hole 180 in the annular body 145. In one or more embodiments, the threaded hole 180 is radially aligned with the wedge assembly housing 155. In one or more embodiments, the torque screw 170 may include a twist-off nut 185 that facilitates threading of the torque screw 170 into the threaded hole 180 of the annular body 145. The twist-off nut 185 may be attached to each torque screw 170 in accordance with U.S. patent application Ser. No. 06/737,807, filed May 23, 1985, now U.S. Pat. No. 4,627,774, the entire disclosure of which is hereby incorporated herein by reference and forms part of the present disclosure.

In one or more embodiments, at least a portion of the gripping wedge 175 of the wedge assembly 160 is received into the respective wedge assembly housing 155 via the respective open mouth 165.

In one or more embodiments, as shown in FIG. 1, in an assembled configuration, the joint restraint 105 is positioned around the first end portion 110A of the first pipe 110. The gripping wedge 175 is positioned within the wedge assembly housing 155 and positioned against a radially outer surface of the first pipe 110. The torque screw 170 is threaded through the threaded hole 180 and contacts the gripping wedge 175. The contact between the torque screw 170 and the gripping wedge 175 provides a downward force that sets the gripping wedge 175 against the first pipe 110. In one or more embodiments, the torque screw 170 is torqued down to set the gripping wedge 175 against the first pipe 110 until an initial pipe holding force is reached. In one or more embodiments, the twist-off nut 185 is configured to shear off once the initial pipe holding force is reached. In one or more embodiments, the twist-off nut 185 ultimately fails in torsional shear at a prescribed torque at which point the gripping wedge 175 is set and pressed against the first pipe 110 such that the gripping wedge 175 provides sufficient initial grip on the first pipe 110 to prevent slippage or relative movement between the gripping wedge 175 and the first pipe 110.

Figure 2A:
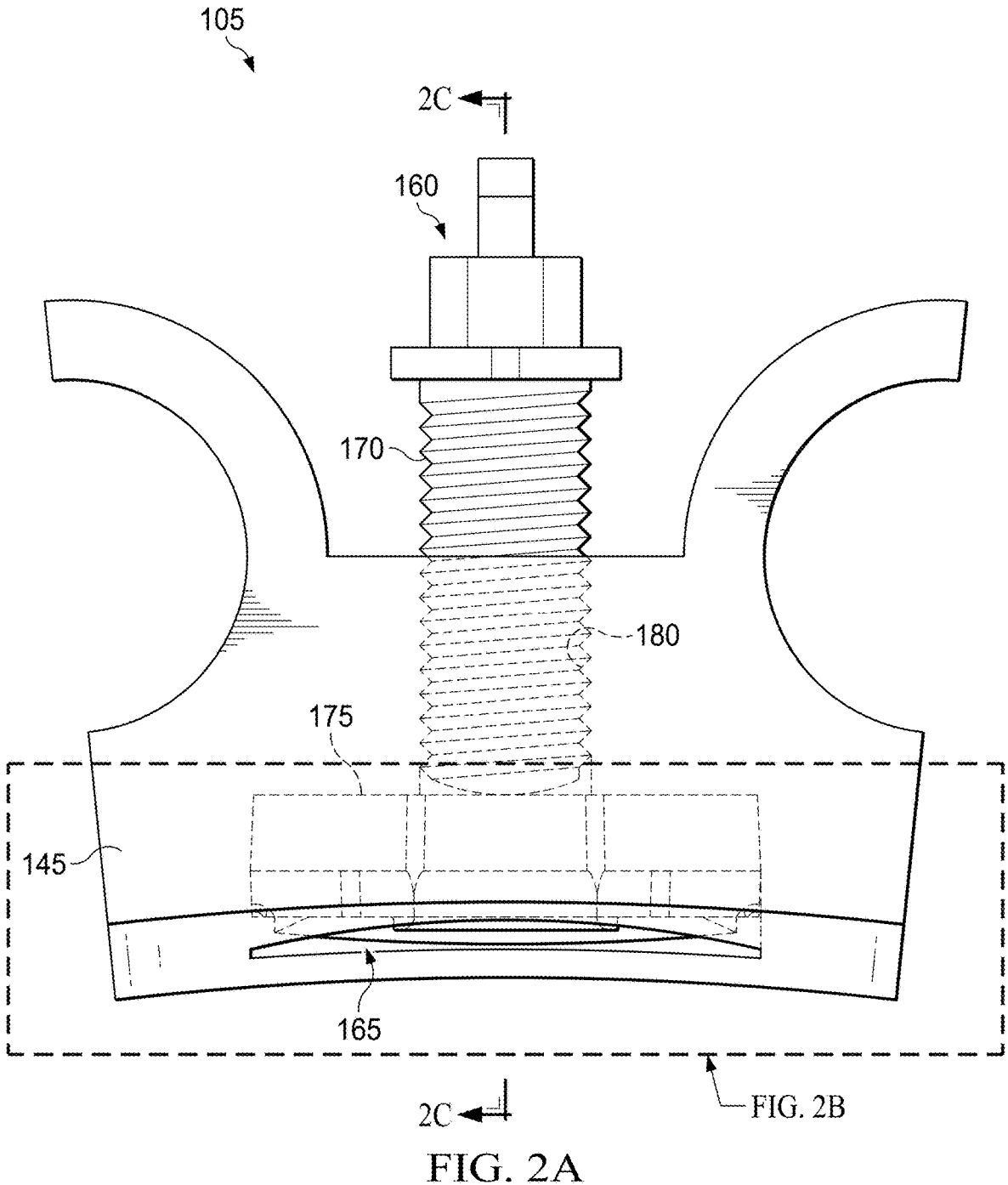
FIG. 2A illustrates a cross-sectional view of the joint restraint of FIG. 1, according to one or more embodiments of the present disclosure.

FIG. 2A illustrates a cross-sectional view of the joint restraint 105 and wedge assembly 160 of FIG. 1, taken along line 2A-2A of FIG. 1, according to one or more embodiments. In the embodiment shown, the wedge assembly 160 is shown without the twist-off nut 185 for simplicity.

Figure 2B:
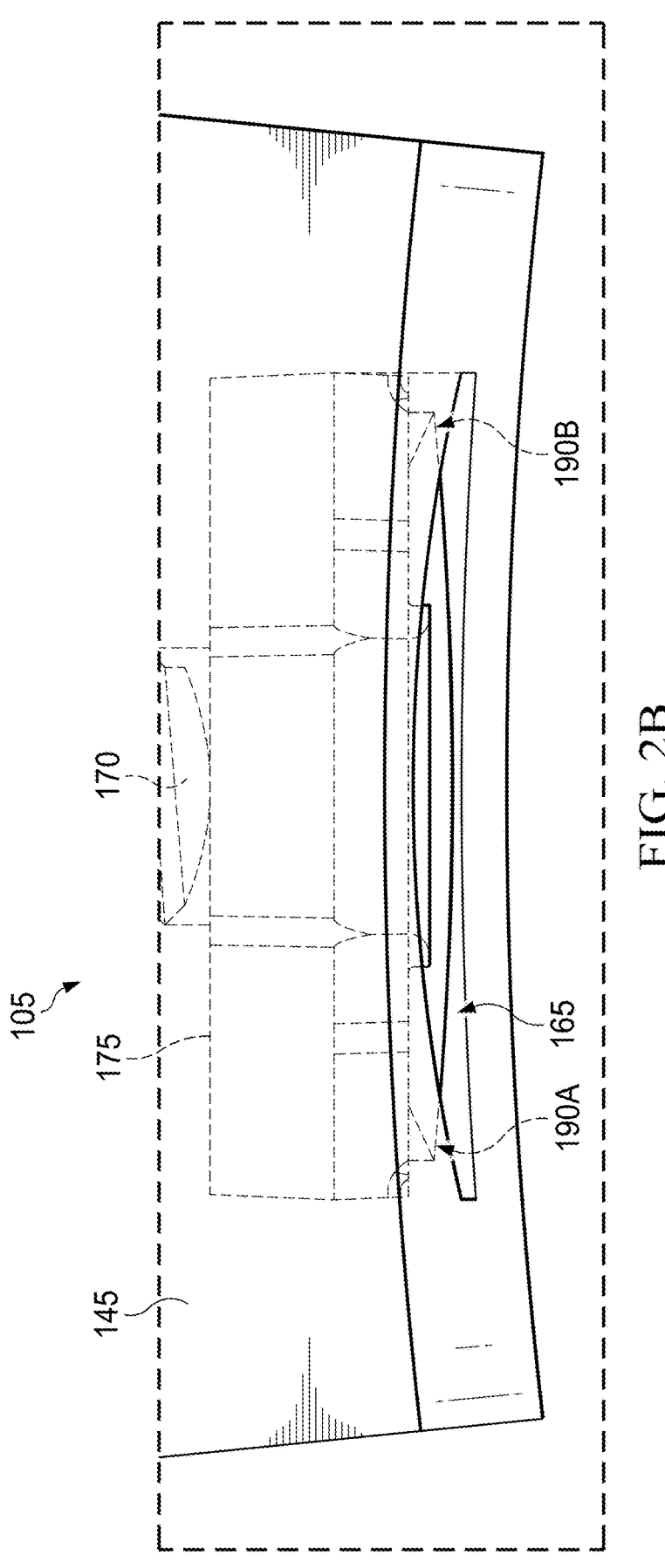
FIG. 2B illustrates an enlarged portion of the cross-sectional view of the joint restraint of FIG. 2A, according to one or more embodiments of the present disclosure.

FIG. 2B illustrates an enlarged view of portion 2B of the joint restraint 105 and the wedge assembly 160 of FIG. 2A, according to one or more embodiments.

As shown in FIGS. 2A and 2B, at least a portion of the gripping wedge 175 is curved in a direction that directly opposes a direction of curvature of the annular body 145 of the joint restraint 105 and that directly opposes a direction of curvature of the first pipe 110 such that when the gripping wedge 175 is positioned adjacent to, and pressed against, the first pipe 110, the at least a portion of the gripping wedge 175 curves away from the first pipe 110.

In one or more embodiments, circumferentially opposing, or laterally opposing, end portions 190A, 190B of the wedge assembly 160 may be curved radially outwardly, opposite to the curvature of the first pipe 110. In one or more embodiments, the circumferential end portions 190A, 190B of the gripping wedge 175 may be flared or curved away from the first pipe 110. In one or more embodiments, the circumferential end portions 190A, 190B of the gripping wedge 175 may be coplanar such that they are devoid of any curvature.

Figure 2C:
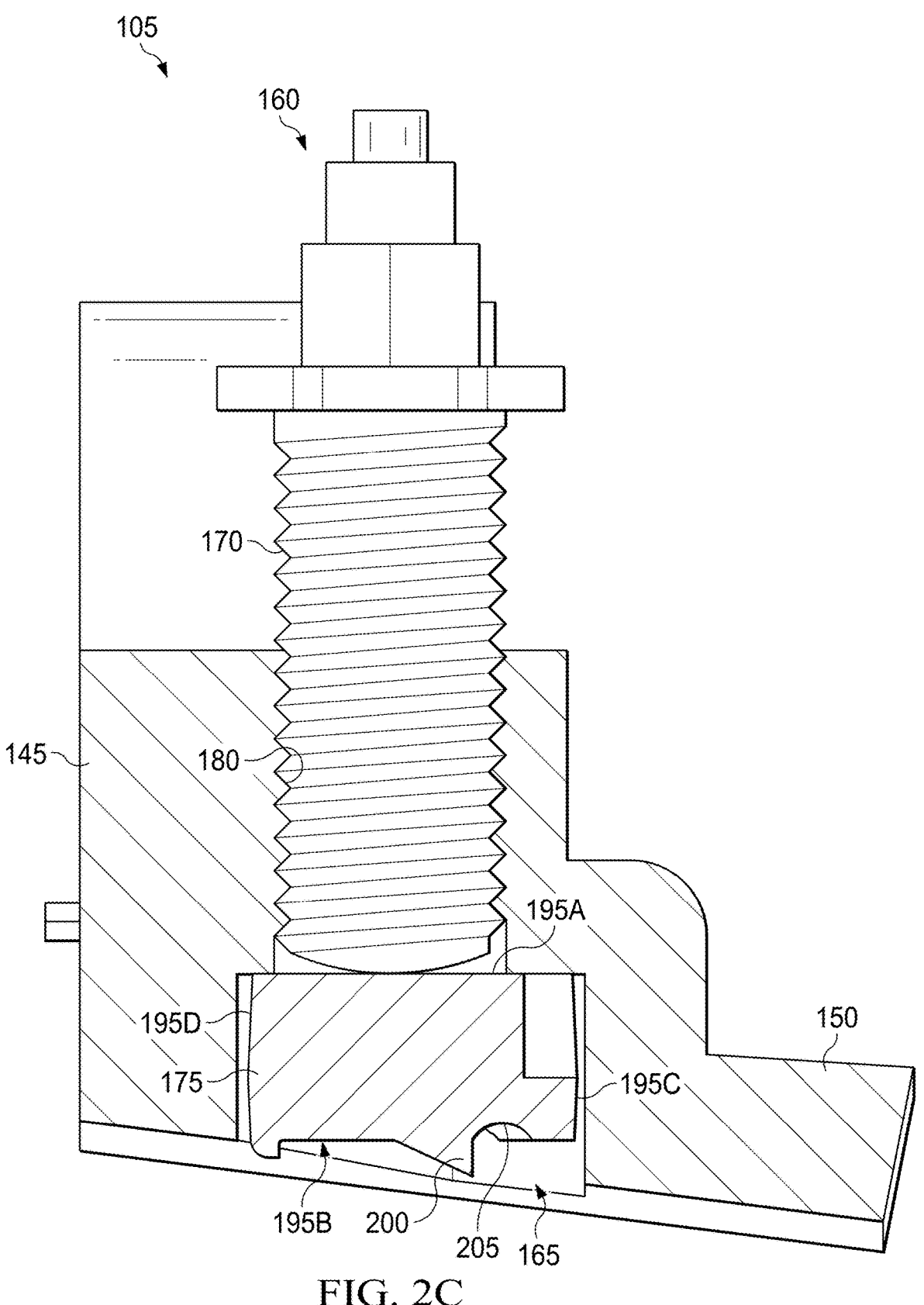
FIG. 2C illustrates another cross-sectional view of the joint restraint of FIG. 1, according to one or more embodiments of the present disclosure.

FIG. 2C illustrates another cross-sectional view of the joint restraint 105 and the wedge assembly 160 taken along line 20-2C of FIG. 2A, according to one or more embodiments. In one or more embodiments, the gripping wedge 175 includes an outer surface 195A (or first surface), an inner surface 195B (or second surface), a front surface 195C (or third surface), and a rear surface 195D (or fourth surface). In one or more embodiments, the outer surface 195A is a radially outer surface 195A, the inner surface 195B is a radially inner surface 195B, the front surface 195C is an axially front surface 195C, and the rear surface 195D is an axially rear surface 195D. In one or more embodiments, the outer surface 195A and the inner surface 195B are radially opposing surfaces, and the front surface 195C and the rear surface 195D are axially opposing surfaces.

In one or more embodiments, as shown in FIG. 2C, the gripping wedge 175 includes a gripping edge 200, or tooth-like projection, which extends circumferentially along the inner surface 195B of the gripping wedge 175. As used herein, 'circumferential' or 'circumferentially' with respect to the gripping wedge 175, or any portion of the gripping wedge 175, may also mean 'lateral' or 'laterally' relative to the axial extension of the gripping wedge 175. In one or more embodiments, the gripping edge 200 extends along at least a portion of the inner surface 195B of the gripping wedge 175. In one or more embodiments, when in the assembled configuration such that the gripping wedge 175 is positioned adjacent to and in contact with the outer surface of the first pipe 110, the gripping edge 200 extends circumferentially along the first pipe 110, substantially transverse to the axial extension of the first pipe 110. In one or more embodiments, where at least a portion of the gripping wedge 175 is curved opposite to the curvature of the first pipe 110, the gripping edge 200 may be included in such curved portion such that circumferentially opposing end portions of the gripping edge 200 do not contact the first pipe 110 when in an initial assembled configuration.

As further shown in FIG. 2C, in one or more embodiments, the gripping wedge 175 further includes a groove 205 extending into the gripping wedge 175 from the inner surface 195B of the gripping wedge 175. In one or more embodiments, the groove 205 is configured to receive material from the outer surface of the first pipe 110 that is displaced during activation of the gripping wedge 175, as will be described in more detail below.

Figure 3A:
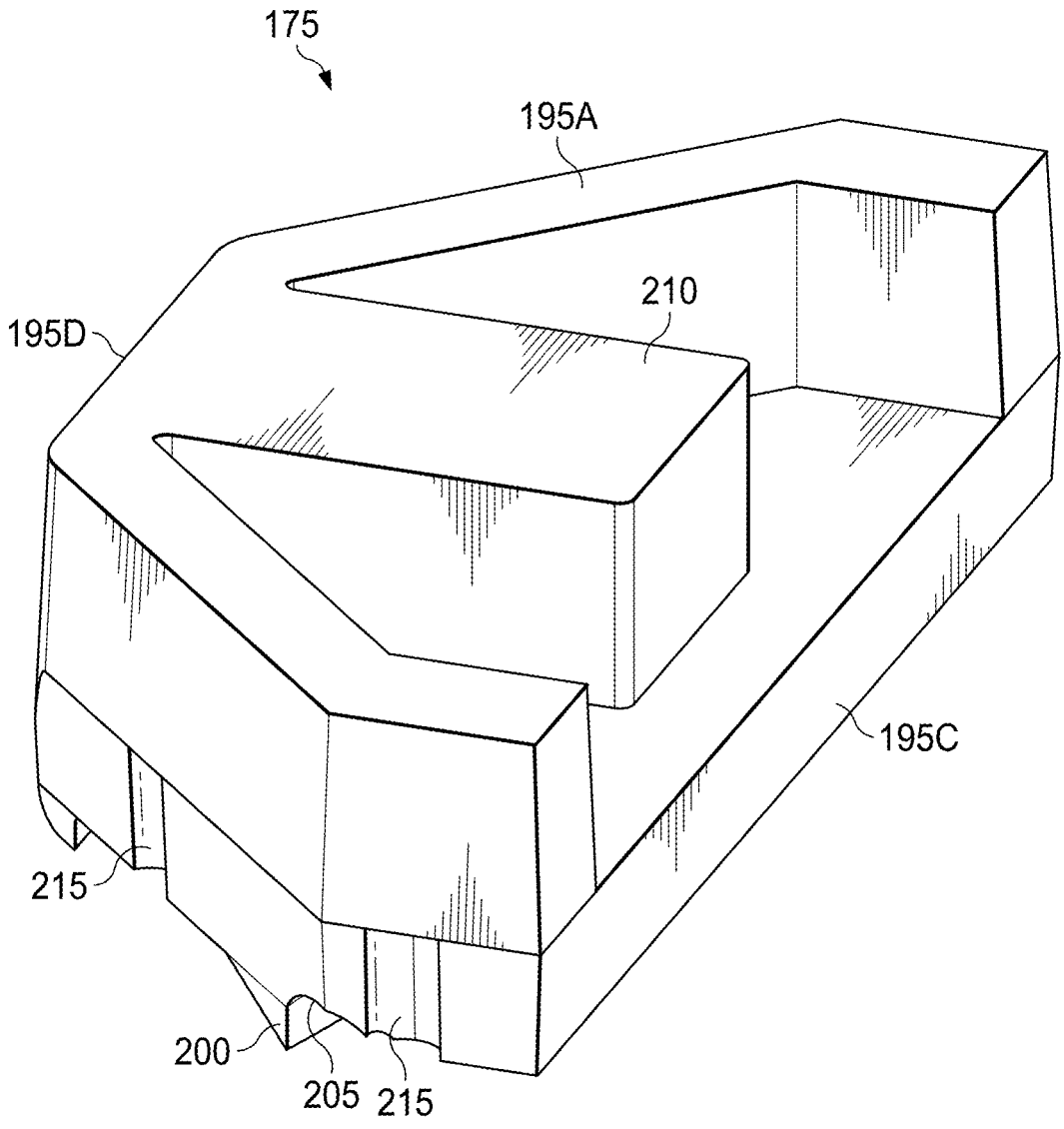
FIG. 3A illustrates a perspective view of the gripping wedge of the joint restraint of FIG. 1, according to one or more embodiments of the present disclosure.

FIG. 3A illustrates a top-front-left perspective view of the gripping wedge 175, according to one or more embodiments. As shown in FIG. 3A, the gripping wedge 175 includes a ledge 210 extending axially at or along the outer surface 195A of the gripping wedge 175 between the front surface 195C and the rear surface 195D of the gripping wedge 175. In one or more embodiments, the ledge 210 extends at or along the outer surface 195A from the rear surface 195D toward the front surface 195C. In one or more embodiments, the ledge 210 is spaced apart from the front surface 195C of the gripping wedge 175. In one or more embodiments, the ledge 210 extends centrally along the gripping wedge 175, such that the ledge 210 is spaced apart from each of the circumferentially opposing end portions of the gripping wedge 175.

In one or more embodiments, the ledge 210 is configured to be contacted by and cooperate with the torque screw 170 such that the torque screw 170 places a downward force on the gripping wedge 175 to facilitate the engagement between the gripping wedge 175 and the first pipe 110. As discussed above, the torque screw 170 is torqued down via the twist-off nut 185 until the twist-off nut 185 shears off at a predetermined torque. As the torque screw 170 is torqued, the downward force placed on the gripping wedge 175 via the contact between the ledge 210 and the torque screw 170 increases. Once the twist-off nut 185 reaches the predetermined toque and shears off, the gripping wedge 175 is set against the first pipe 110, via the torque screw 170, with an initial pipe holding force. In one or more embodiments, the ledge 210 is a flat contact surface. In one or more other embodiments, as will be discussed in more detail below, the ledge 210 may be an inclined contact surface to facilitate continued contact between the torque screw 170 and the gripping wedge 175 during and after activation of the gripping wedge 175 to thereby maintain sufficient downward force on the gripping wedge 175.

As further shown in FIG. 3A, the gripping wedge 175 further includes side channel 215 extending radially through at least a portion of the gripping wedge 175, according to one or more embodiments. In one or more embodiments, the side channels 215 extend along the circumferentially opposing sides of the gripping wedge 175 and have open faces configured to be positioned adjacent to interior walls of the respective wedge assembly housing 155 in which the gripping wedge 175 is received. In one or more embodiments, the side channels 215 are configured to receive an adhesive, such as a hot melt adhesive, which is configured to hold or retain the gripping wedge 175 in place within the respective wedge assembly housing 155 during assembly of the gripping wedge 175 into the respective wedge assembly housing 155 and during assembly of the pipe joint restraint 105 onto the first pipe 110. In one or more embodiments, the gripping wedge 175 may include one side channel 215. In one or more embodiments, the gripping wedge 175 may include two or more side channels 215. In one or more embodiments, the gripping wedge 175 may include at least one side channel 215 on each circumferential side of the gripping wedge 175. In one or more embodiments, the gripping wedge 175 may include side channels 215 on only one circumferential side of the gripping wedge 175. In one or more embodiments, the gripping wedge 175 may include two or more side channels 215 on either side of the gripping wedge 175.

Figure 3B:
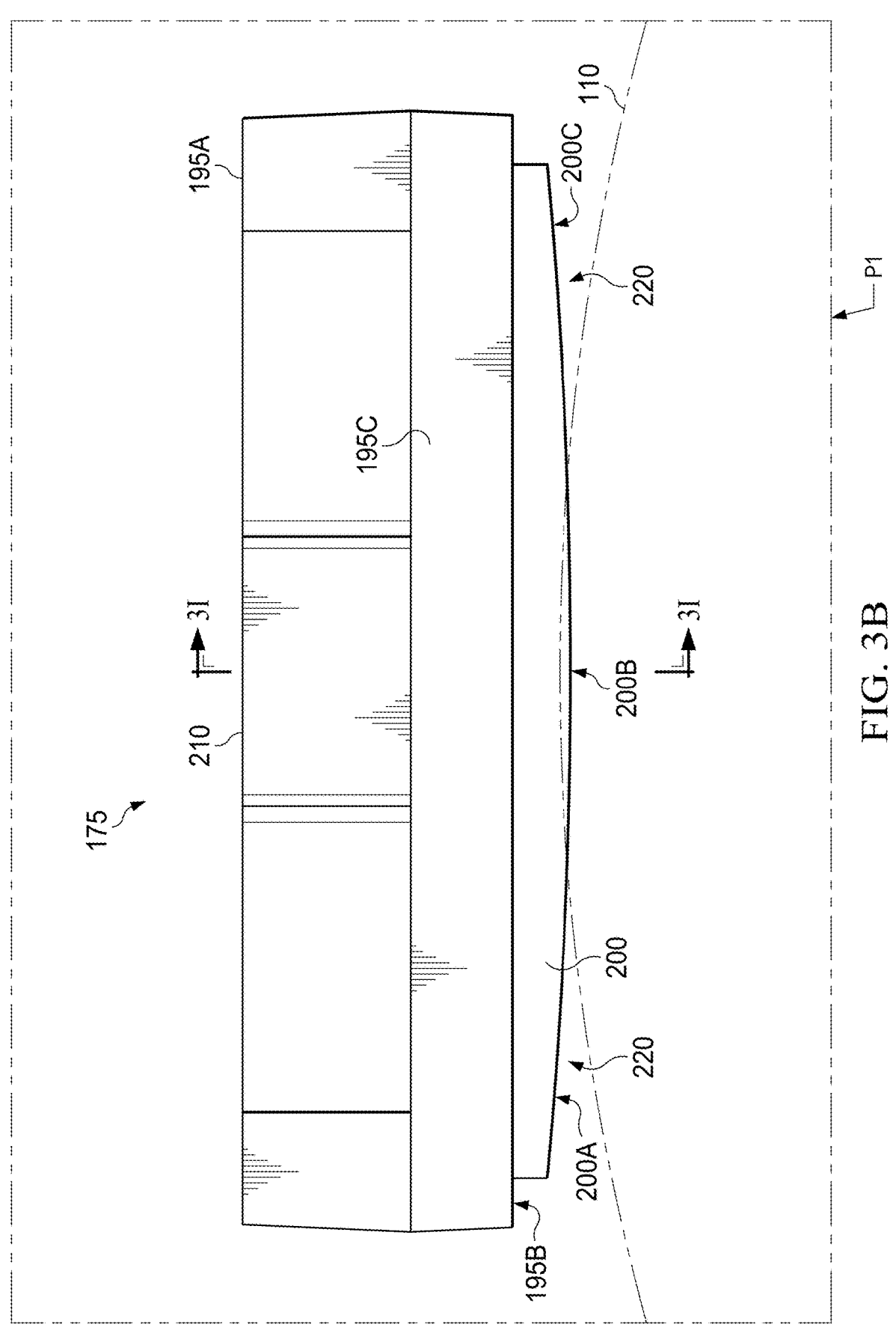
FIG. 3B illustrates a front elevational view of the gripping wedge of the joint restraint of FIG. 1, according to one or more embodiments of the present disclosure.

FIG. 3B illustrates a front elevational view of the gripping wedge 175, according to one or more embodiments. In FIG. 3B, the front elevation view of the gripping wedge 175 illustrates the gripping wedge 175 extending in a plane P1. In one or more embodiments, the plane P1 is perpendicular to the axial extension of the gripping wedge 175 and perpendicular to the central axis of the joint restraint 105 and the first pipe 110.

As shown in FIG. 3B, the gripping edge 200 of the gripping wedge 175 is curved in the plane P1. In one or more embodiments, the gripping wedge 175 is curved upward, toward the upper surface of the gripping wedge 175. In one or more embodiments, the gripping edge 200 is curved in a direction opposite to the direction of curvature of the annular body 145 of the joint restraint 105 and opposite to the direction of curvature of the first pipe 110. In one or more embodiments, the gripping edge 200 may have a radius of curvature that is centered about a point or an axis that is parallel to the central axis of the first pipe 110 and to the central axis of the joint restraint 105, but which is spaced radially outwardly of, or above, the outer surface of the first pipe 110 and the outer surface 195A of the gripping wedge 175.

In one or more embodiments, the gripping edge 200 may define a first circumferential end portion 200A, a center portion 200B, and a second circumferential end portion 200C that opposes the first circumferential end portion 200A. In one or more embodiments, the center portion 200B may be curved as described above. In one or more other embodiments, the center portion 200B of the gripping edge 200 may be flat instead of curved. In one or more embodiments, the opposing first and second circumferential end portions 200A,200C may be curved as described above. In one or more embodiments, the first and second circumferential end portions 200A,200C of the gripping edge 200 may have the same radius of curvature, which may be centered about the same point or axis above the gripping wedge 175.

In one or more embodiments, only the center portion 200B of the gripping edge 200 is in contact with the first pipe 110 when the joint restraint 105 is installed on the first pipe 110. As a result of the curvature of the gripping edge 200, a gap 220 (or "space", or "region") is created between the gripping wedge 175 and the first pipe 110 when the joint restraint 105 is installed on the first pipe 110. In one or more embodiments, each gap 220 extends between the center portion 200B of the gripping edge 200 and a respective circumferential end of the gripping edge 200 on either side of the center portion 200B. Due to the curvature of the gripping edge 200, a radial height of each gap 220 increases the further away from the center portion 200B the gap 220 extends.

In one or more embodiments, the gaps 220 facilitate the ability of the gripping wedge 175 to grip the first pipe 110 during activation of the joint restraint 105 and the gripping wedge 175. In one or more embodiments, as the gripping wedge 175 is activated, the gripping edge 200 digs into the outer surface of the first pipe 110 and displaces material from the outer surface of the first pipe 110. As discussed above, this displaced material 230 can cause interference issues if it remains between the inner surface 195B of the gripping wedge 175 and outer surface of the first pipe 110 in such quantities that the ability of the gripping edge 200 to dig into and hold the first pipe 110 is compromised. To reduce the incidence of such interference issues, in one or more embodiments, the displaced material 230 from the outer surface of the first pipe 110 may be displaced into the gaps 220 on either side of the center portion 200B of the gripping edge 200 so that the displaced material 230 does not prevent the gripping edge 200 from digging into the outer surface of the first pipe 110. By providing the gaps 220 between the gripping wedge 175 and the pipe at the first and second circumferential end portions 200A,200C of the gripping edge 200 for the displaced material 230 to extend into, slipping, jumping, and dislodging of the gripping edge 200 is reduced, if not prevented altogether.

In one or more embodiments, the groove 205 may be curved in the plane P1 in the same way that the gripping edge 200 is curved in the plane P1 as described above. In one or more other embodiments, the groove 205 may not be curved in the plane P1.

Figure 3C:
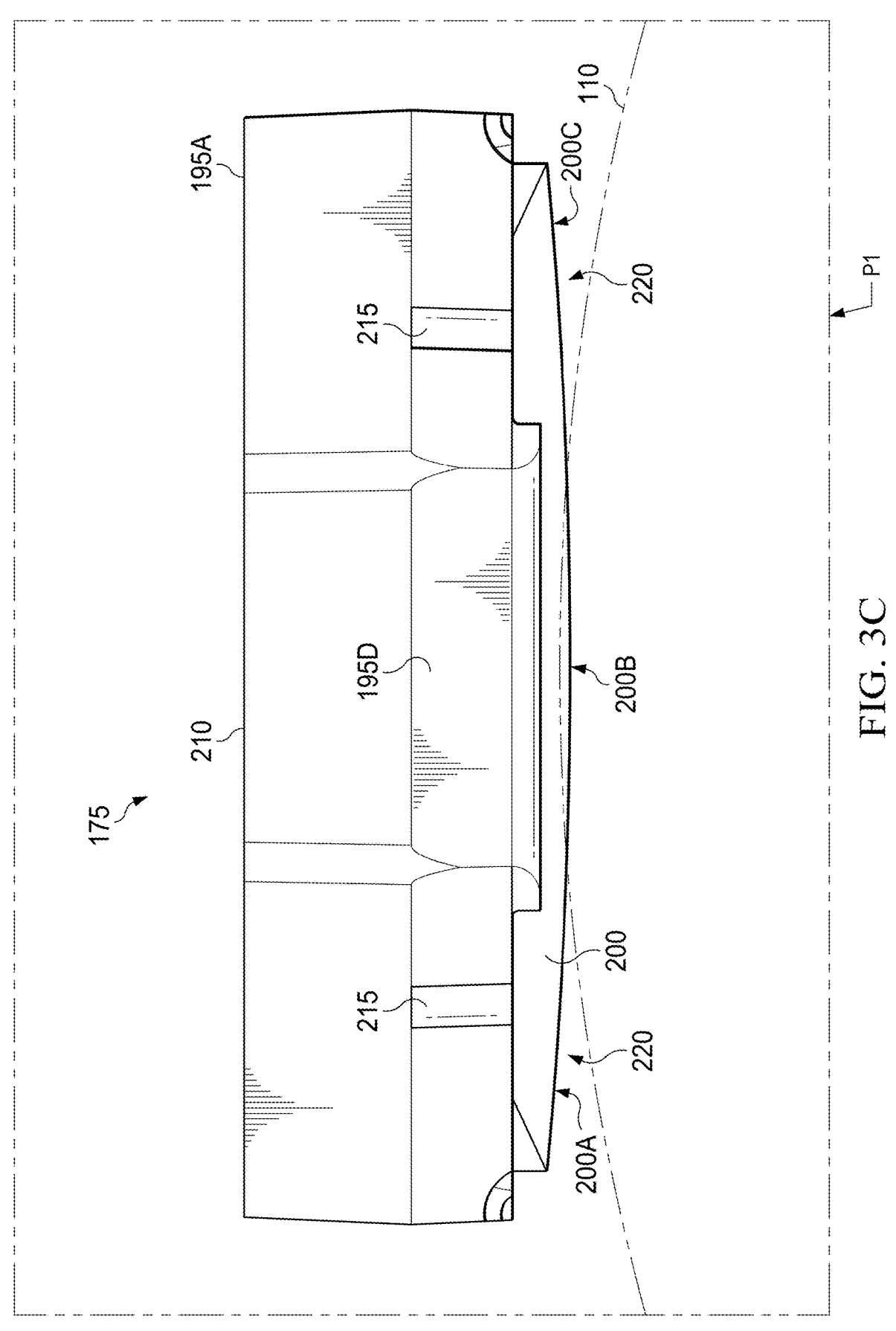
FIG. 3C illustrates a rear elevational view of the gripping wedge of the joint restraint of FIG. 1, according to one or more embodiments of the present disclosure.

FIG. 3C illustrates a rear elevational view of the gripping wedge 175, according to one or more embodiments. FIG. 3C illustrates a rear view of the curvature of the gripping edge 200 in the plane P1. FIG. 3C also illustrates additional side channels 215 of the gripping wedge 175, according to one or more embodiments.

Figure 3D:
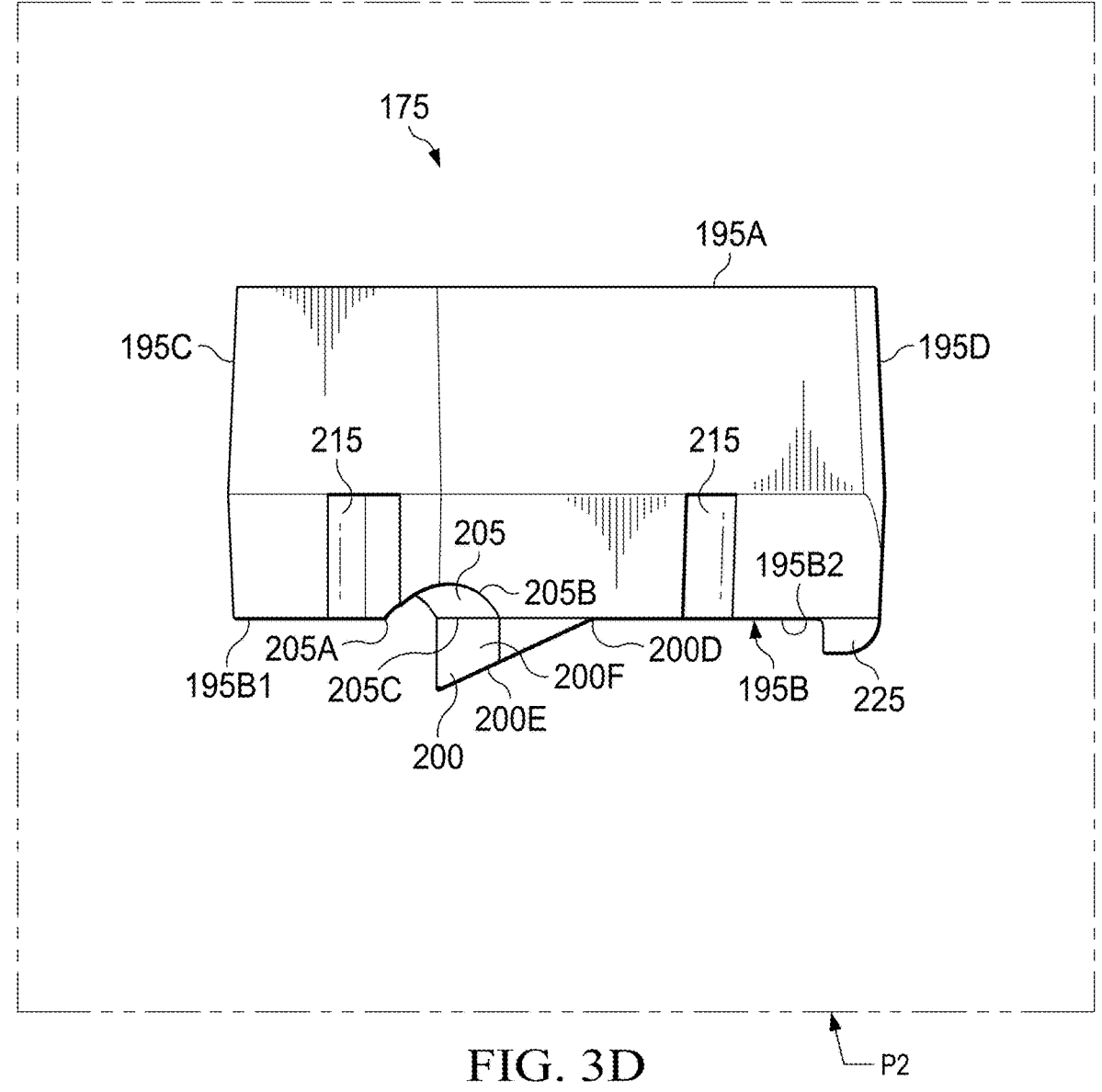
FIG. 3D illustrates a right side elevational view of the gripping wedge of the joint restraint of FIG. 1, according to one or more embodiments of the present disclosure.

FIG. 3D illustrates a right-side elevational view of the gripping wedge 175, according to one or more embodiments.

In FIG. 3D, the right-side elevational view of the gripping wedge 175 illustrates the gripping wedge 175 extending in a plane P2. In one or more embodiments, the plane P2 extends parallel to the axial extension of the gripping wedge 175, parallel to the central axis of the joint restraint 105 and of the first pipe 110, and perpendicular to the plane P1.

In one or more embodiments, the groove 205 extending into the inner surface 195B of the gripping wedge 175 is curved or semi-circular. In one or more embodiments, the groove 205 is curved in the plane P2. In one or more embodiments, the groove 205 extends between the circumferentially opposing end surfaces of the gripping wedge 175. In the embodiment shown, the groove 205 extends in the inner surface 195B of the gripping wedge 175 along the entire circumferential width of the gripping wedge 175 between the circumferentially opposing end surfaces of the gripping wedge 175. In one or more other embodiments, the groove 205 may only extend in the inner surface 195B of the gripping wedge 175 part way, or partially, along the circumferential width of the gripping wedge 175 between the circumferentially opposing end surfaces of the gripping wedge 175. In one or more embodiments, the groove 205 may be described as defining a recess or recessed area extending into the gripping wedge 175.

In one or more embodiments, the groove 205 is positioned axially closer to the front surface 195C of the gripping wedge 175 than to the rear surface 195D of the gripping wedge 175. In one or more embodiments, the groove 205 is positioned axially closer to an axial end of the gripping wedge 175 that is positioned axially closer to the annular projection 150 of the joint restraint 105 when the gripping wedge 175 is assembled into the joint restraint 105. In one or more embodiments, the groove 205 is positioned axially closer to an axial end of the gripping wedge 175 that is positioned axially closer to the second pipe 115 when the gripping wedge 175 is assembled into the joint restraint 105 and the joint restraint 105 is installed onto the first pipe 110.

In one or more embodiments, the groove 205 is positioned in the gripping wedge 175 axially between the gripping edge 200 and the front surface 195C of the gripping wedge 175. In one or more embodiments, at least a portion of the groove 205 is positioned in the gripping wedge 175 axially between the gripping edge 200 and the front surface 195C of the gripping wedge 175. In one or more embodiments, the groove 205 includes or defines a first edge 205A, a second edge 205B, and a third edge 205C. In one or more embodiments, the second edge 205B defines the curvature of the groove 205 into the bottom surface of the gripping wedge 175 and is bounded by the first edge 205A and the third edge 205C. In one or more embodiments, the second edge 205B defines the curvature of the groove 205 in the plane P2. In one or more embodiments, the first edge 205A of the groove 205 is positioned axially between the third edge 205C of the groove 205 and the front surface 195C and axially between the gripping edge 200 and the front surface 195C.

In one or more embodiments, the gripping edge 200 includes a first edge 200D and a second edge 200E. In one or more embodiments, the gripping edge 200 is inclined from the first edge 200D to the second edge 200E such that the gripping edge 200 extends below the bottom surface of the gripping wedge 175. In one or more embodiments, the gripping edge 200 is inclined toward the front surface 195O of the gripping wedge 175 such that the second edge 200E of the gripping edge 200 is axially closer to the front surface 195C than the first edge 200D of the gripping edge 200. In one or more embodiments, the gripping edge 200 is inclined in the plane P2. In one or more embodiments, the second edge 200E of the gripping edge 200 is axially aligned with the third edge 205C of the groove 205 such that a front wall 200F of the gripping edge 200 coincides with the third edge 205C of the groove 205, and such that the gripping edge 200 is positioned proximate, or adjacent, to the groove 205. In such embodiments, the gripping edge 200 seamlessly transitions into the groove 205 such that the gripping edge 200 and the groove 205 define a J-shape profile or cross-section.

As further shown in FIG. 3D, in one or more embodiments, the gripping wedge 175 may include a projection tab 225 extending from the bottom surface of the gripping wedge 175 and position axially near or adjacent to the rear surface 195D of the gripping wedge 175. In one or more embodiments, the projection tab 225 is configured to facilitate pivoting of the gripping wedge 175 during activation of the gripping wedge 175 to improve ability of the gripping edge 200 to dig into and grip the first pipe 110. In one or more embodiments, the projection tab 225 may also be configured to reduce interference between the gripping wedge 175 and the first pipe 110 by spacing at least a portion of the gripping wedge 175 from the first pipe 110 such that any debris or displaced material 230 that may navigate between the at least a portion of the gripping wedge 175 and the first pipe 110 do not compromise the ability of the gripping wedge 175 to dig into and grip the first pipe 110.

In one or more embodiments, the groove 205 is positioned between the front surface 195C of the gripping wedge 175 and the gripping edge 200. In the embodiment shown, there is no additional gripping edge 200 between the groove 205 and the front surface 195C of the gripping wedge 175. In one or more embodiments, this allows the gripping wedge 175 to pivot further, and may further facilitate the ability of the gripping edge 200 to dig into the surface of the pipe without interference, or minimal interference from displaced material 230. In one or more embodiments, the gripping wedge 175 may include another gripping edge 200 (shown in FIGS. 5A-61) positioned between the groove 205 and the front surface 195C of the gripping wedge 175 such that there is a gripping edge 200 on either side, axially, of the groove 205.

As further shown in FIG. 3D, in one or more embodiments, the front surface 195C and the rear surface 195D of the gripping wedge 175 are chamfered or beveled. In one or more embodiments, each of the front surface 195C and the rear surface 195D has a chamfer from the outer surface 195A extending inward toward the inner surface 195B and from the inner surface 195B extending outward toward the outer surface 195A. In one or more embodiments, the chamfers or bevels of the front surface 195C and the rear surface 195D are configured to enable and promote the gripping wedge 175 to pivot within the wedge assembly housing 155 of the joint restraint 105 about the gripping edge 200 during activation of the gripping wedge 175 without, or with negligible, interference between the gripping wedge 175 and the wedge assembly housing 155.

In one or more embodiments, the inner surface 195B may include first inner surface portion 195B1 and second inner surface portion 195B2. In one or more embodiments the groove 205 may be formed in, and extend into, the first inner surface portion 195B1. In one or more embodiments, the first inner surface portion 195B1 is adjacent the front surface 195C. In one or more embodiments, at least a portion of the groove 205 is positioned between the first inner surface portion 195B1 and the gripping edge 200. In one or more embodiments, at least a portion of the gripping edge 200 is offset from the first inner surface portion 195B1 in a direction perpendicular to a plane in which the first inner surface portion 195B1 extends, which may be plane P3 shown in FIG. 3G.

In one or more embodiments, the gripping wedge 175 may include a second gripping edge (not shown). In one or more embodiments, the second gripping edge may extend adjacent the groove 205 opposite the gripping edge 200 such that at least a portion of the groove 205 is positioned between the gripping edge 200 and the second gripping edge. In one or more embodiments, the second gripping edge may extend adjacent the first inner surface portion and the gripping edge 200 may extend adjacent the second inner surface portion 195B2. In one or more embodiments, at least a portion of the first inner surface portion 195B1 may be positioned between the second gripping edge and the groove 205. In one or more embodiments, the first inner surface portion 195B1 and the second inner surface portion 195B2 may be spaced apart by the groove 205 and the first gripping edge 200.

Figure 3E:
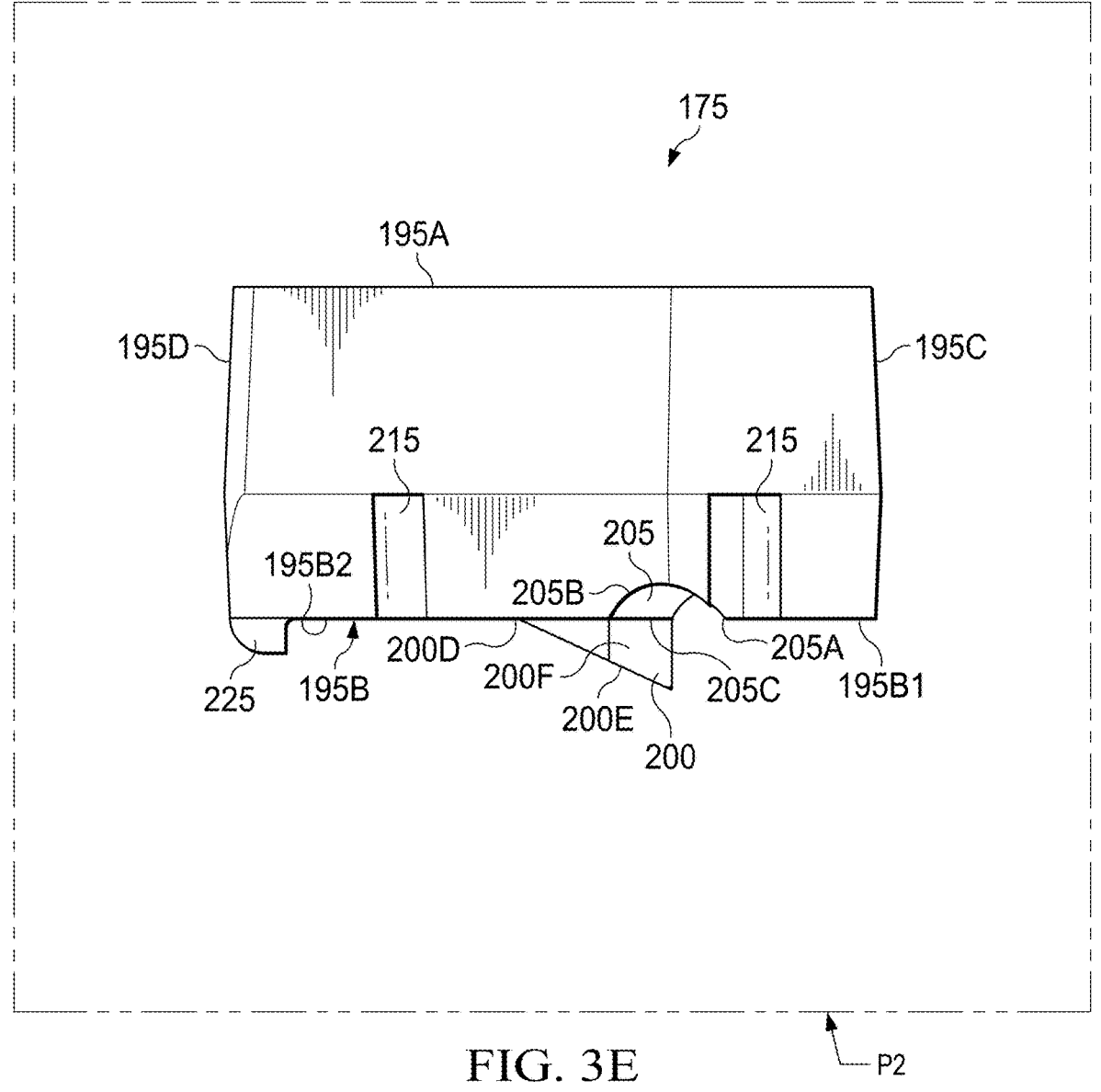
FIG. 3E illustrates a left side elevational view of the gripping wedge of the joint restraint of FIG. 1, according to one or more embodiments of the present disclosure.

FIG. 3E illustrates a left-side elevational view of the gripping wedge 175, according to one or more embodiments.

Figure 3F:
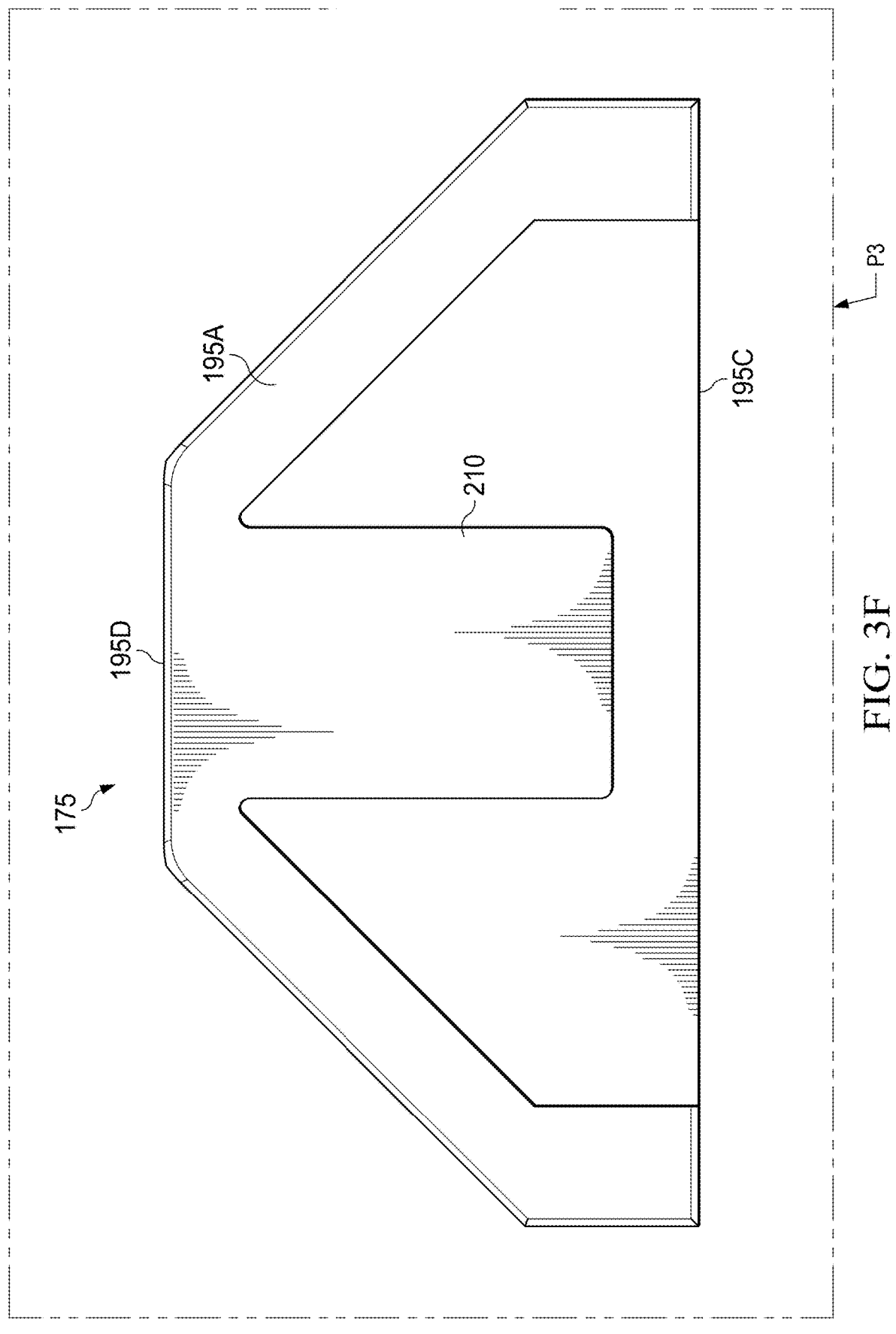
FIG. 3F illustrates a top plan view of the gripping wedge of the joint restraint of FIG. 1, according to one or more embodiments of the present disclosure.

FIG. 3F illustrates a top plan view of the gripping wedge 175, according to one or more embodiments. In FIG. 3F, the top plan view of the gripping wedge 175 illustrates the gripping wedge 175 extending in a plane P3. In one or more embodiments, the plane P3 extends parallel to the axial extension of the gripping wedge 175, parallel to the central axis of the joint restraint 105 and of the first pipe 110, perpendicular to the plane P1, and perpendicular to the plane P2.

Figure 3G:
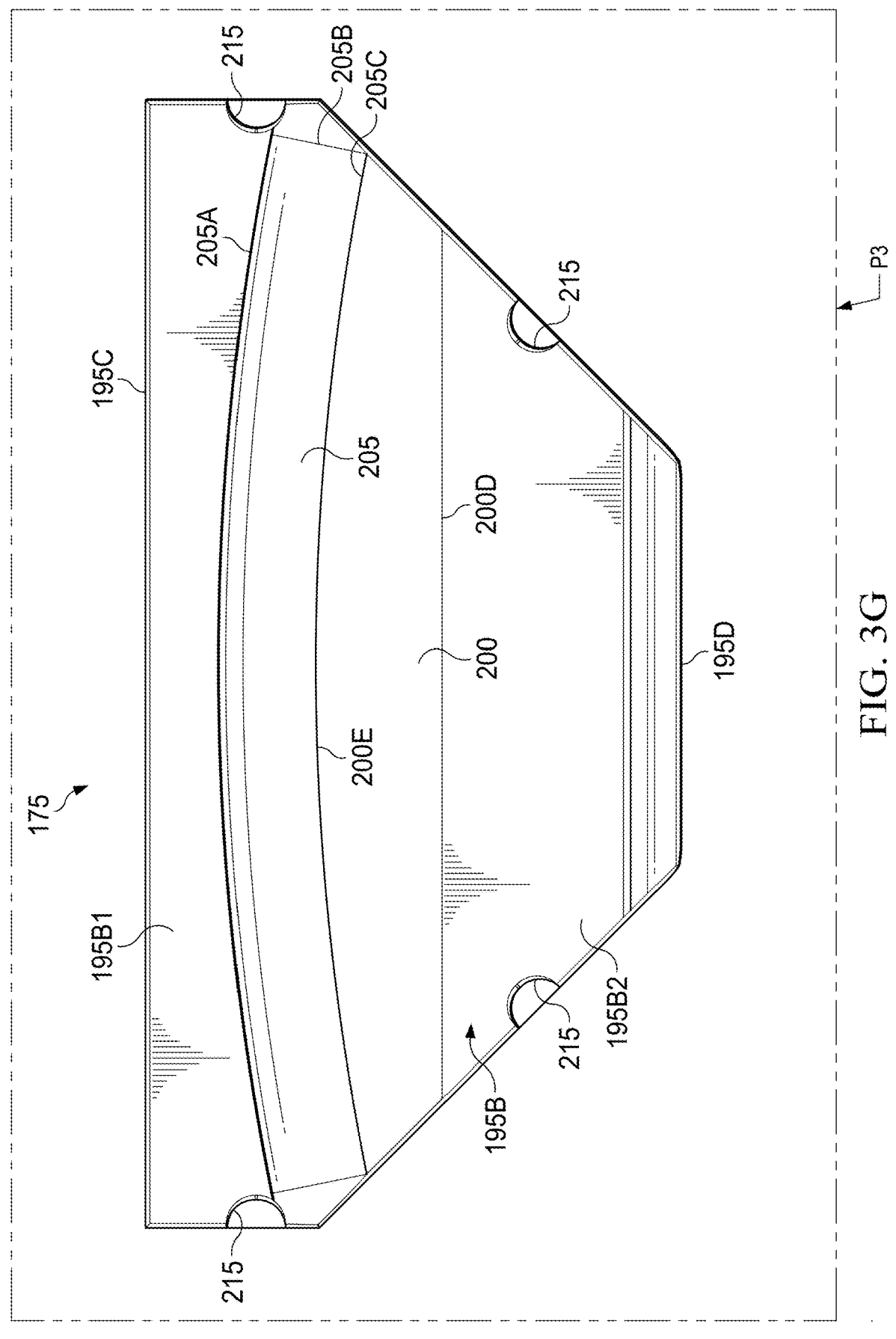
FIG. 3G illustrates a bottom plan view of the gripping wedge of the joint restraint of FIG. 1, according to one or more embodiments of the present disclosure.

FIG. 3G illustrates a bottom plan view of the gripping wedge 175, according to one or more embodiments. In FIG. 3G, the bottom plan view of the gripping wedge 175 illustrates the gripping wedge 175 extending in the plane P3. As stated above, the plane P3 is parallel to the axial extension of the gripping wedge 175, parallel to the central axis of the joint restraint 105 and of the first pipe 110, perpendicular to the plane P1, and perpendicular to the plane P2.

As shown in FIG. 3G, the groove 205 and the gripping edge 200 are curved in the plane P3 such that the groove 205 and the gripping edge 200 are curved in the direction of the axial extension of the gripping wedge 175, of the joint restraint 105, and of the first pipe 110. In the embodiment shown, the groove 205 and the gripping edge 200 are curved toward the front surface 195C of the gripping wedge 175 such that the curvatures of the groove 205 and the gripping edge 200 in the plane P3 open toward the rear surface 195D of the gripping wedge 175. In such embodiments, the groove 205 and the gripping edge 200 may have a radius of curvature that is centered about a point or an axis that is perpendicular to the central axis of the joint restraint 105 and the first pipe 110, and which may be positioned axially behind the rear surface 195D of the gripping wedge 175, in the opposite direction relative to the front surface 195C of the gripping wedge 175. In other words, in one or more embodiments, the groove 205 and the gripping edge 200 may have curvatures that are coaxial with each other. In one or more embodiments, because the gripping edge 200 coincides with the groove 205, the groove 205 and the gripping edge 200 have the same curvature.

In one or more embodiments, the groove 205 may be curved in the plane P1, the plane P2, and/or in the plane P3. In one or more embodiments, the groove 205 is curved in the plane P1 and in the plane P3 such that the groove 205 is curved in two planes that are perpendicular to each other. In one or more embodiments, the groove 205 is curved in the plane P1 and in the plane P2 such that the groove 205 is curved in two planes that are perpendicular to each other. In one or more embodiments, the groove 205 is curved in the plane P2 and in the plane P3 such that the groove 205 is curved in two planes that are perpendicular to each other. In one or more embodiments, the groove 205 is curved in two directions that are substantially perpendicular to each other. In one or more embodiments, the groove 205 is curved in a direction opposing the direction of the curvature of the first pipe 110 and in a direction of the axial extension of the first pipe 110. In one or more embodiments, the groove 205 is curved in the plane P1, the plane P2, and in the plane P3 such that the groove 205 is curved in three planes, each of which is perpendicular to the others.

In one or more embodiments, the gripping edge 200 may be curved in the plane P1, the plane P2, and/or in the plane P3. In one or more embodiments, the gripping edge 200 is curved in the plane P1 and in the plane P3 such that the gripping edge 200 is curved in two planes that are perpendicular to each other. In one or more embodiments, the gripping edge 200 is curved in the plane P1 and in the plane P2 such that the gripping edge 200 is curved in two planes that are perpendicular to each other. In one or more embodiments, the gripping edge 200 is curved in the plane P2 and in the plane P3 such that the gripping edge 200 is curved in two planes that are perpendicular to each other. In one or more embodiments, the gripping edge 200 is curved in two directions that are substantially perpendicular to each other. In one or more embodiments, the gripping edge 200 is curved in a direction opposing the direction of the curvature of the first pipe 110 and in a direction of the axial extension of the first pipe 110. In one or more embodiments, the gripping edge 200 is curved in the plane P1, the plane P2, and in the plane P3 such that the gripping edge 200 is curved in three planes, each of which is perpendicular to the others.

In one or more embodiments, as will be discussed in more detail below, the curvature of the groove 205 and/or of the gripping edge 200 in the plane P3 facilitates removal of material that is displaced from the surface of the first pipe 110 by the gripping edge 200 of the gripping wedge 175 digging into the surface of the first pipe 110. As the gripping edge 200 pushed forward into the surface of the first pipe 110, the resultant material displaced from the surface of the first pipe 110 is received into the groove 205 and distributed circumferentially outward and axially backward relative to the gripping wedge 175 following the curvature of the groove 205 and/or of the gripping edge 200 in the plane P3. In one or more embodiments, this curvature of the groove 205 and/or of the gripping edge 200 in the plane P3 offers improved removal of and distribution of the displaced material 230 as compared to a gripping wedge 175 with a groove 205 and/or gripping edge 200 that is not curved in the plane P3, but rather is straight.

Figure 3H:
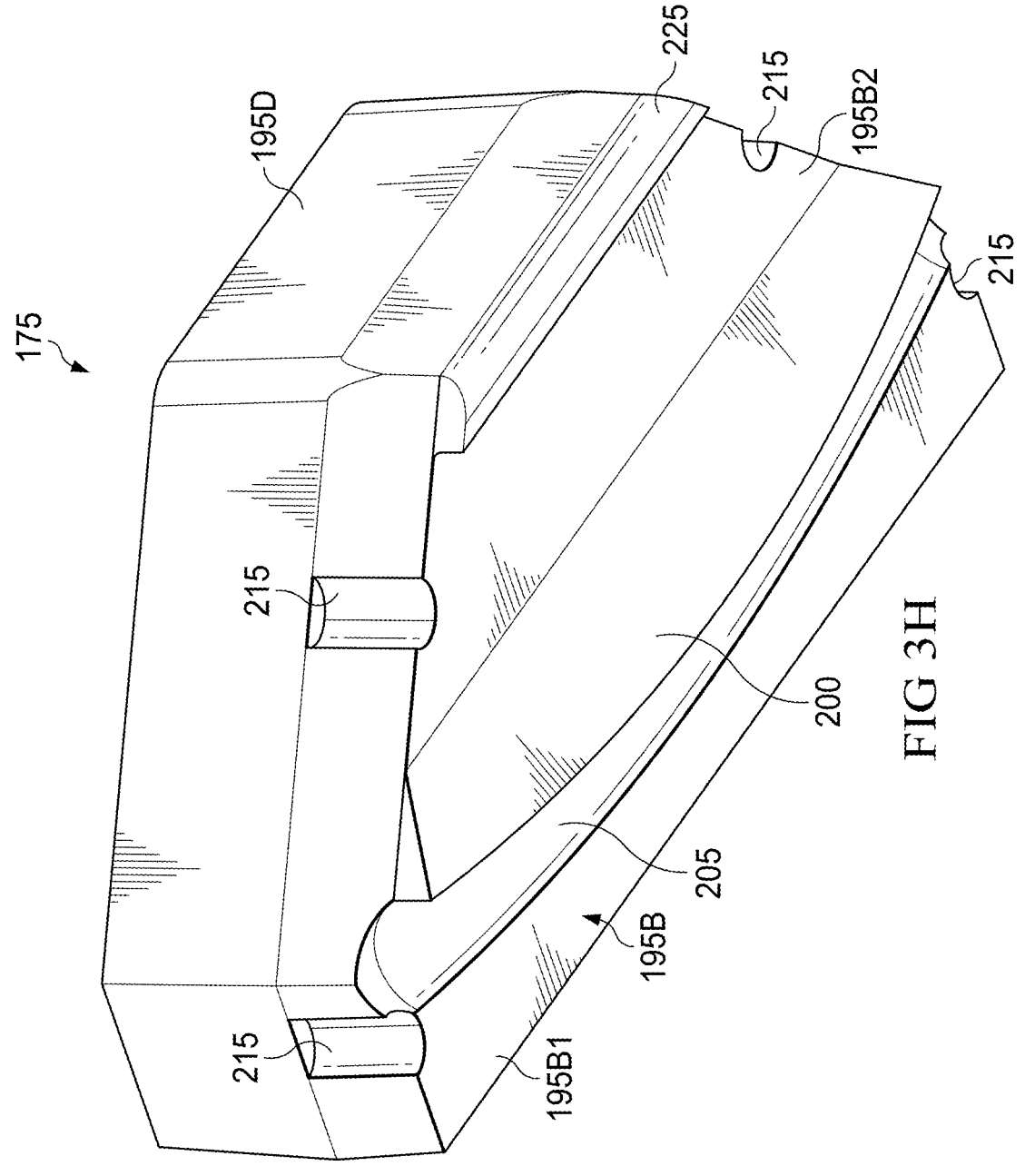
FIG. 3H illustrates another perspective view of the gripping wedge of the joint restraint of FIG. 1, according to one or more embodiments of the present disclosure.

FIG. 3H illustrates a bottom-rear-right perspective view of the gripping wedge 175, according to one or more embodiments.

Figure 3I:
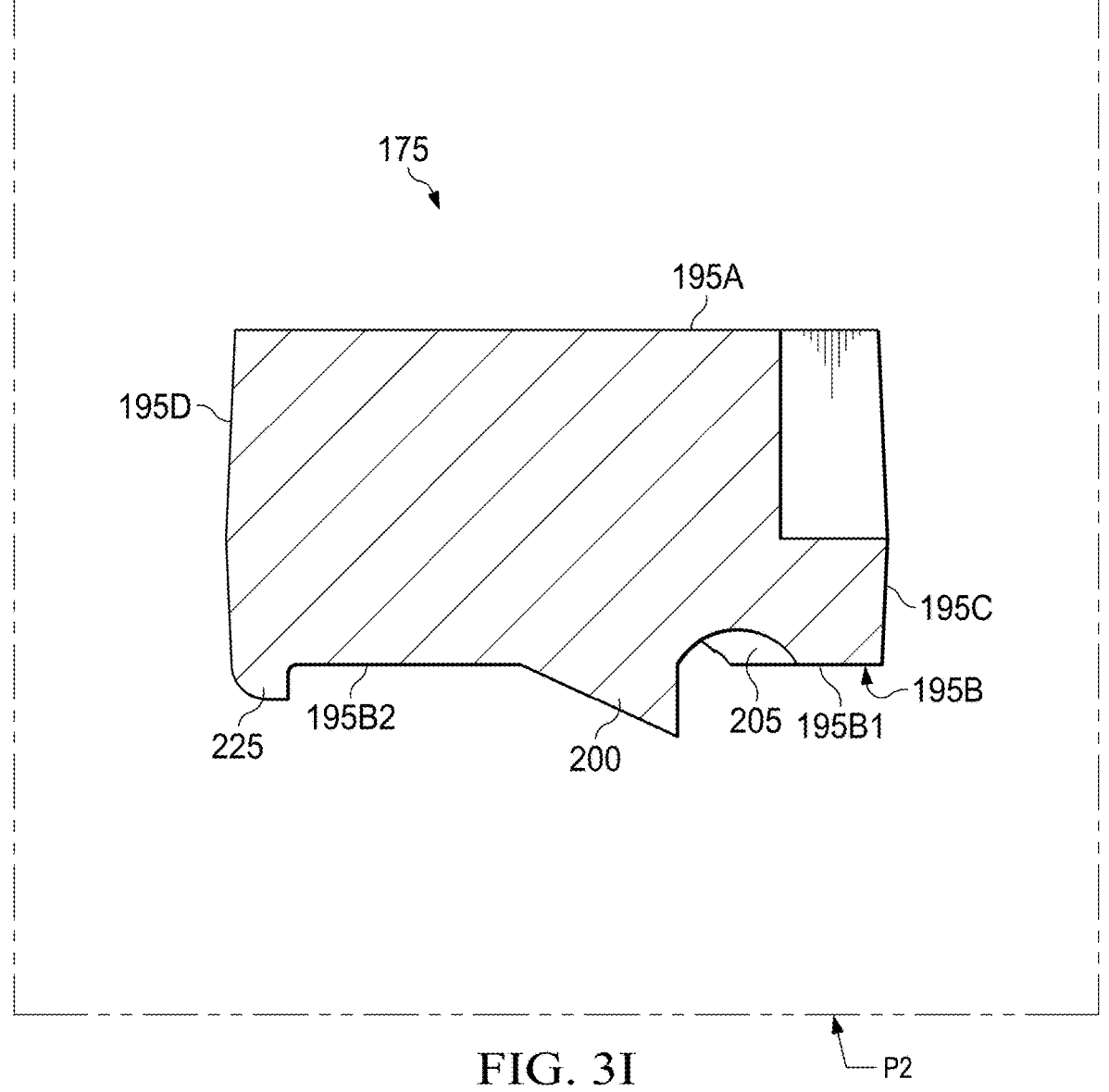
FIG. 3I illustrates a cross-sectional view of the gripping wedge of the joint restraint of FIG. 1, according to one or more embodiments of the present disclosure.

FIG. 3I illustrates a left-side cross-sectional view of the gripping wedge 175, according to one or more embodiments.

Figure 4A:
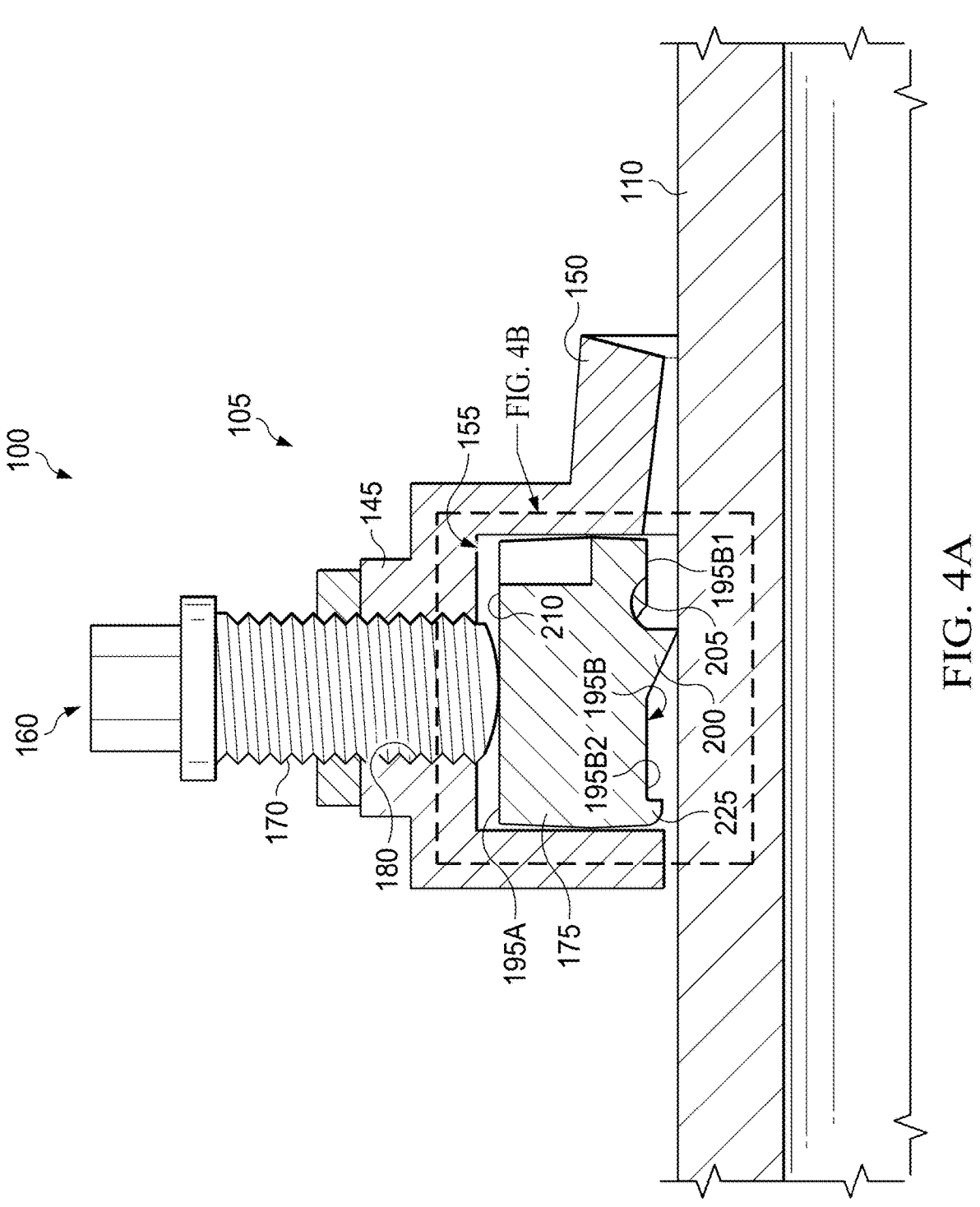
FIG. 4A illustrates a cross-sectional view of the joint restraint of FIG. 1 in a first configuration, according to one or more embodiments of the present disclosure.

FIG. 4A illustrates the joint restraint system 100 in a first configuration, according to one or more embodiments.

In the first configuration shown in FIG. 4A, the joint restraint 105 is partially installed onto the first pipe 110, but the gripping wedge 175 is not yet activated. As shown in FIG. 4A, the wedge assembly 160 has been torqued down such that the twist-off nut 185 has been sheared off and such that the torque screw 170 is pressing the gripping wedge 175 against the first pipe 110 with an initial holding force. However, in the first configuration, the joint restraint system 100 is not yet pressurized and the gripping wedge 175 is not yet activated, meaning that the gripping edge 200 of the gripping wedge 175 is not yet digging into and gripping the first pipe 110.

Figure 4B:
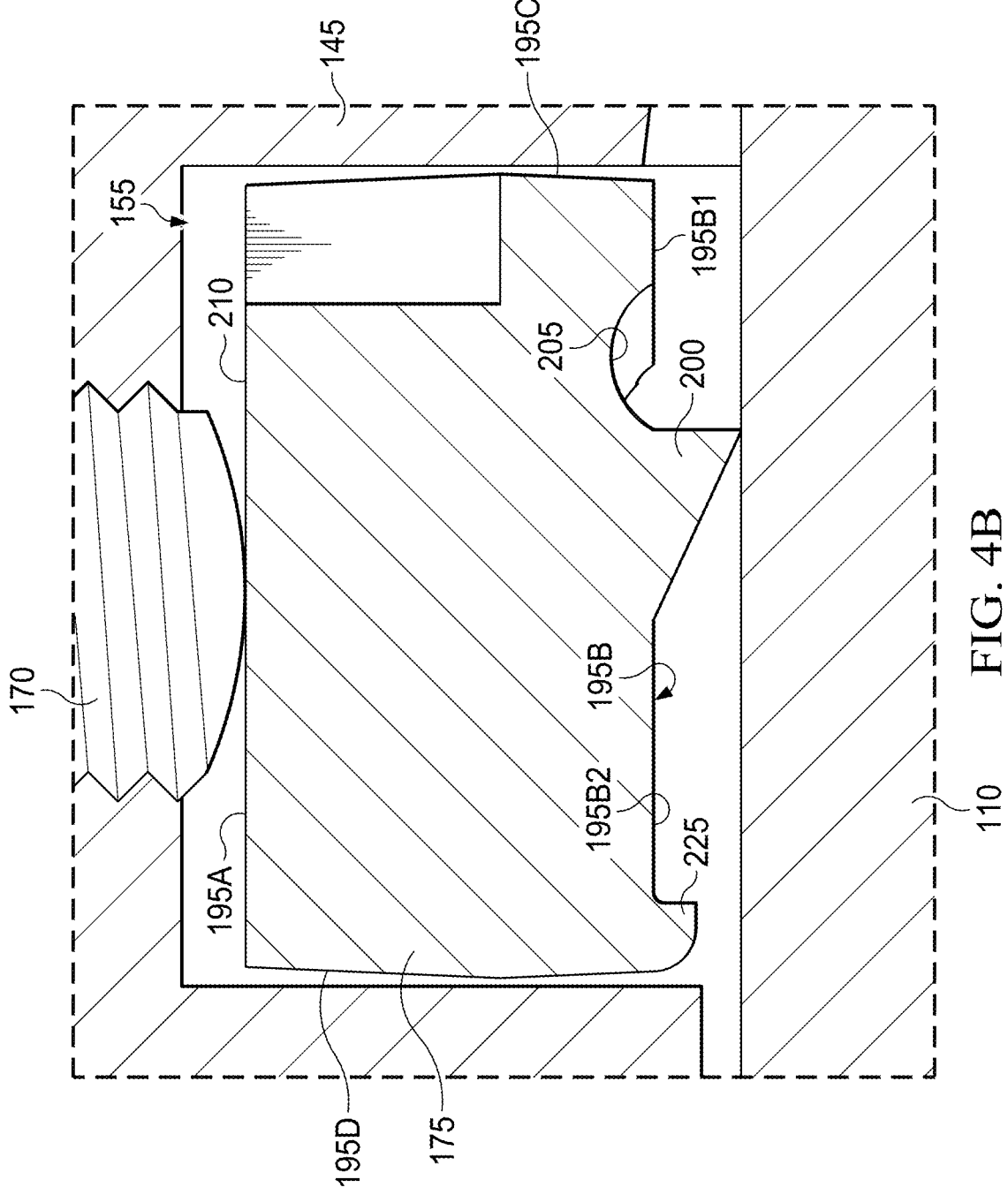
FIG. 4B illustrates an enlarged portion of the cross-sectional view of the joint restraint of FIG. 4A, according to one or more embodiments of the present disclosure.

FIG. 4B illustrates an enlarged view of portion 4B of the joint restraint system 100 of FIG. 4A, according to one or more embodiments.

Figure 4C:
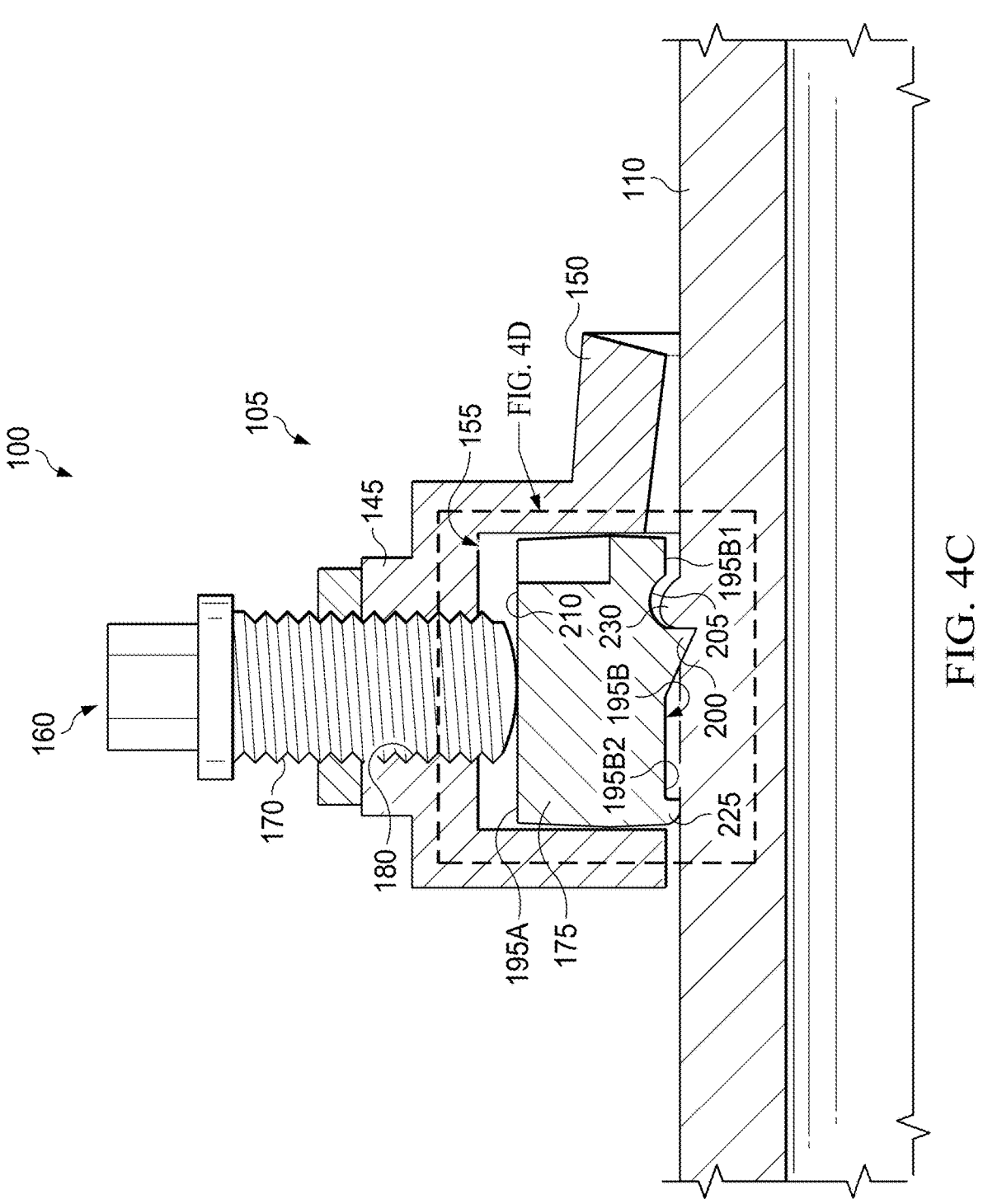
FIG. 4C illustrates a cross-sectional view of the joint restraint of FIG. 1 in a second configuration, according to one or more embodiments of the present disclosure.

FIG. 4C illustrates the joint restraint system 100 in a second configuration, according to one or more embodiments.

In the second configuration shown in FIG. 4C, the joint restraint system 100 is pressurized and the gripping wedge 175 begins to activate. As the first pipe 110 is pressurized, the first pipe 110 is forced rearward, or to the left in the illustration shown in FIG. 4C, relative to the gripping wedge 175 as the coupling of the first pipe 110 and the second pipe 115 is urged to separate under pressure. In one or more embodiments, the relative movement between the gripping wedge 175 and the first pipe 110, as well as the downward force placed upon the gripping wedge 175 by the torque screw 170, causes the gripping edge 200 of the gripping wedge 175 to dig into the first pipe 110. In one or more embodiments, the gripping wedge 175 may begin to pivot due to the relative movement between the gripping wedge 175 and the first pipe 110, which pivoting motion facilitates the engagement of the gripping edge 200 and promotes the ability of the gripping edge 200 to dig into the first pipe 110.

In one or more embodiments, as the gripping edge 200 of the gripping wedge 175 digs into and grips the first pipe 110, the gripping edge 200 displaces material from the outer surface of the first pipe 110, including displaced material 230. In one or more embodiments, the deeper the gripping edge 200 penetrates into the first pipe 110, the greater the amount of anchorage or gripping force the gripping wedge 175 provides relative to the first pipe 110. In one or more embodiments, the displaced material 230 may further promote such increased anchorage or gripping force of the gripping wedge 175 with respect to the first pipe 110 as the displaced material 230 provides additional surface area for the front wall 200F of the gripping edge 200 to contact.

However, as discussed above, the displaced material 230 can also create interference between the gripping wedge 175 and the first pipe 110, which prevents the gripping edge 200 from penetrating deeper into the first pipe 110 and can cause the gripping edge 200 to slip, jump, or become dislodged from the first pipe 110 such that the gripping force of the gripping wedge 175 relative to the first pipe 110 is reduced. As shown in FIG. 4C, and as will be discussed in more detail below, the groove 205 of the gripping wedge 175 is configured to receive the displaced material 230, which substantially reduces, if not eliminates, any interference between the gripping wedge 175 and the first pipe 110 caused by the displaced material 230.

Figure 4D:
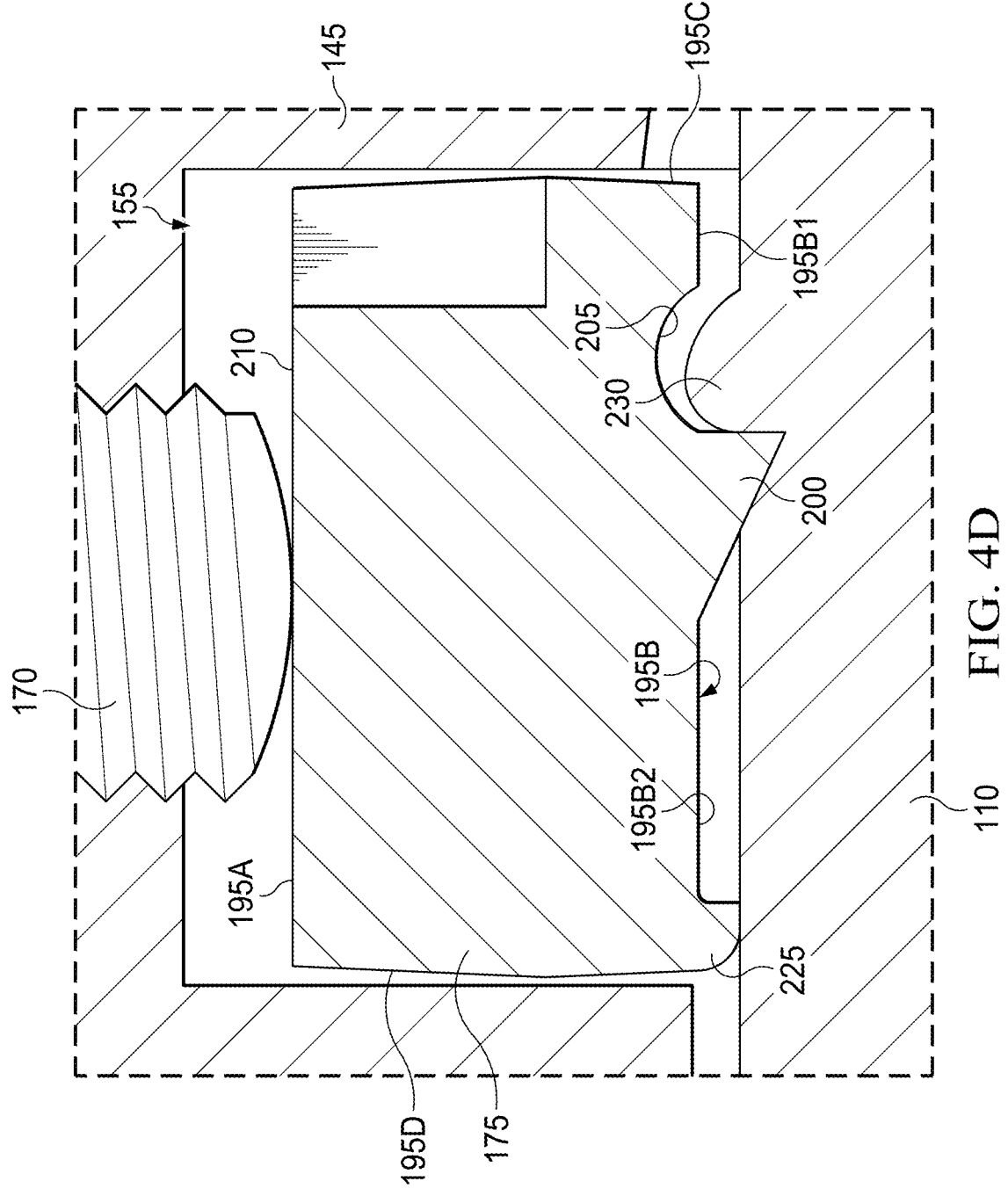
FIG. 4D illustrates an enlarged portion of the cross-sectional view of the joint restraint of FIG. 4C, according to one or more embodiments of the present disclosure.

FIG. 4D illustrates an enlarged view of portion 4D of the joint restraint system 100 of FIG. 4C, according to one or more embodiments.

Figure 4E:
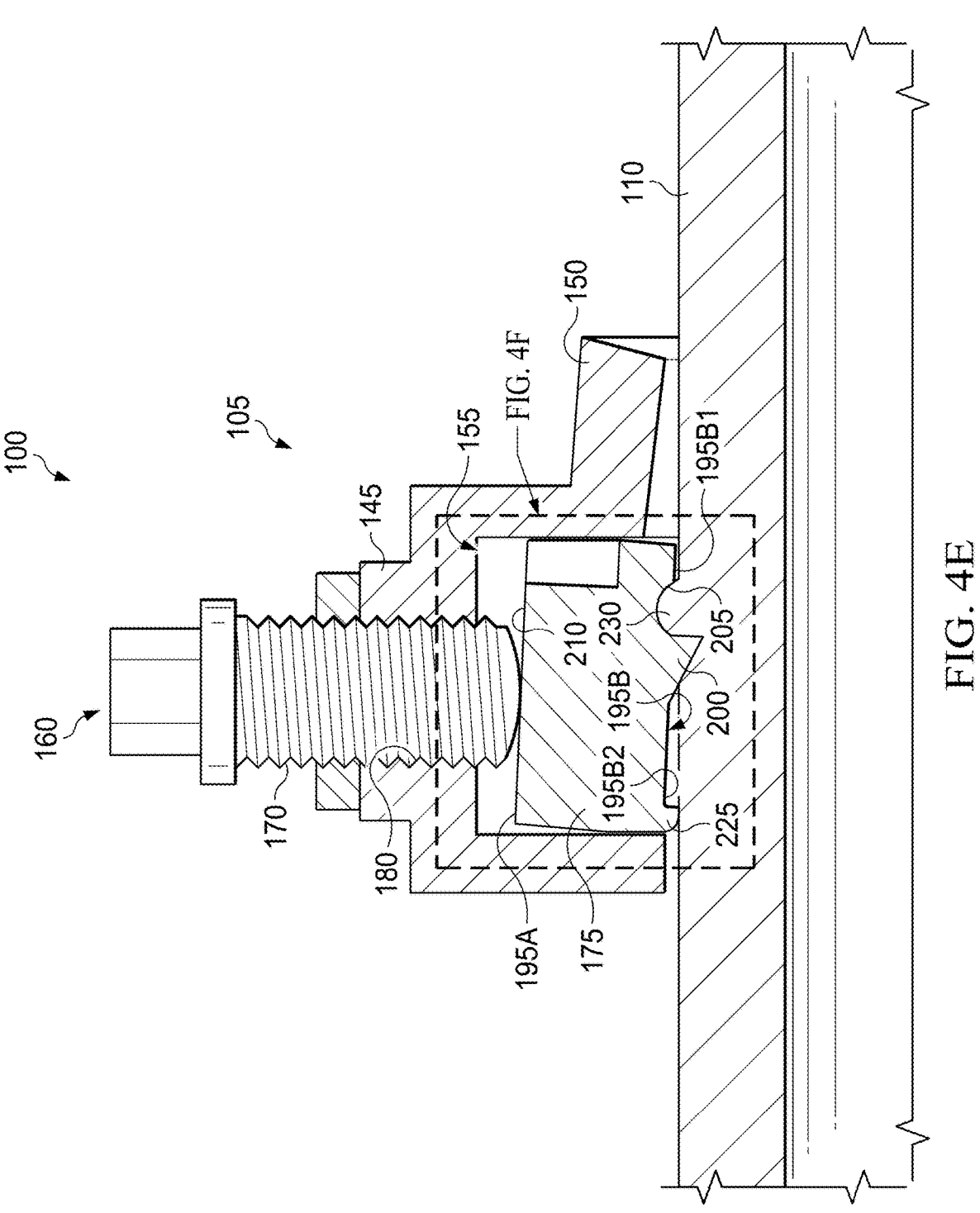
FIG. 4E illustrates a cross-sectional view of the joint restraint of FIG. 1 in a third configuration, according to one or more embodiments of the present disclosure.

FIG. 4E illustrates the joint restraint system 100 in a third configuration, according to one or more embodiments.

In the third configuration shown in FIG. 4E, the gripping wedge 175 is fully activated. In one or more embodiments, the gripping wedge 175 has pivoted, or rocked, forward within the wedge assembly housing 155 in the third configuration. In one or more embodiments, the torque screw 170 remains in contact with, and maintains the application of downward force with respect to, the gripping wedge 175. In one or more embodiments, the ability of the gripping wedge 175 to pivot within the wedge assembly housing 155 is facilitated by the chamfers in the front surface 195C and the rear surface 195D of the gripping wedge 175. In one or more embodiments, the ability of the gripping wedge 175 to pivot within the wedge assembly housing 155 is facilitated by the projection tab 225, which may urge the gripping wedge 175 to pivot in the desired direction. In one or more embodiments, the pivoting of the gripping wedge 175 enables the gripping edge 200 to penetrate deeper into the first pipe 110, which facilitates increased grip strength of the gripping wedge 175 with respect to the first pipe 110. In one or more embodiments, as the gripping edge 200 penetrates deeper into the first pipe 110, the volume of the displaced material 230 increases as more material of the first pipe 110 is displaced.

In one or more embodiments, the groove 205 of the gripping wedge 175 is configured to receive the displaced material 230 within the groove 205. In one or more embodiments, the groove 205 is configured to receive the displaced material 230 within the recess defined by the groove 205. In one or more embodiments, a size of the groove 205 is substantially similar to the size of the gripping edge 200. In one or more embodiments, a volume of the groove 205 is substantially the same as a volume of the gripping edge 200. Theoretically, the gripping edge 200 will displace a volume of material from the first pipe 110 that is substantially the same as the volume of the portion of the gripping edge 200 that penetrates into the first pipe 110. In some embodiments, the volume of the displaced material 230 may be greater than the volume of the portion of the gripping edge 200 that penetrates into the first pipe 110. In one or more embodiments, the groove 205 may have a volume that is greater than or equal to the volume of the gripping edge 200 such that the groove 205 is configured to receive all of the displaced material 230 that is displaced from the surface of the first pipe 110 by the gripping edge 200. In one or more embodiments, the groove 205 may be configured to receive at least a portion of the displaced material 230.

In one or more embodiments, the size or volume of the recessed groove 205 of the gripping wedge 175 may be designed based on the amount of displaced material 230 required to be received within the groove 205 in order to reduce or eliminate the incidence of interference between the gripping wedge 175 and the first pipe 110, to the extent necessary or required for a given application. In one or more embodiments, the volume of the displaced material 230 created during activation of the gripping wedge 175, and the volume of displaced material 230 required to be received within the groove 205 in order to reduce or eliminate the resulting interference, may be determined experimentally. In one or more embodiments, based on the design of the gripping wedge 175, the size of the gripping edge 200, the type of material of the first pipe 110, the pressure in the first pipe 110, or any other parameters relevant to the creation of the displaced material 230, different amounts of material may be displaced by the gripping edge 200 when the gripping wedge 175 is activated and different amounts of the displaced material 230 may be required to be received within the groove 205 of the gripping wedge 175 to reduce or eliminate the resulting interference caused by the presence of the displaced material 230 between the gripping wedge 175 and the first pipe 110.

As discussed above, the displaced material 230 can create interference issues between the gripping wedge 175 and the first pipe 110 if the displaced material 230 is positioned directly between the gripping wedge 175 and the first pipe 110 such that the displaced material 230 hinders or prevents the gripping edge 200 of the gripping wedge 175 from digging into the surface of the first pipe 110, thereby reduced the effectiveness and ability of the gripping wedge 175 to grip the first pipe 110.

As also discussed above, the curvature of the groove 205 and/or gripping edge 200 in the plane P1, the plane P2, and/or the plane P3, which planes are perpendicular to each other, facilitate improved removal, relocation, and distribution of the displaced material 230 such that the displaced material 230 does not remain directly between the gripping wedge 175 and the first pipe 110 where such displaced material 230 would cause interference issues. The curvature of the groove 205 and/or gripping edge 200 in the plane P1 that directly opposes the curvature of the first pipe 110 creates the respective gaps 220 located at the first and second circumferential end portions 200A,200C of the gripping edge 200. Each gap 220 provides a space for the displaced material 230 to extend into away from the center portion 200B of the gripping edge 200 where buildup of the displaced material 230 could cause interference issues.

The curvature of the groove 205 into the inner surface 195B, or the first inner surface portion 195B1, in the plane P2 facilitates receipt of the displace material 230 into the groove 205 such that the displaced material 230 does not remain directly between the gripping wedge 175 and the first pipe 110.

The curvature of the groove 205 and/or gripping edge 200 in the plane P3 that is parallel to the axial extension of the griping wedge, the joint restraint 105, and the first pipe 110 also facilitates removal, relocation, and distribution of the displaced material 230 such that the displaced material 230 does not remain directly between the gripping wedge 175 and the first pipe 110 and cause interference issues. Due to the pressure in the pipe joint system, the first pipe 110 is forced rearward relative to the gripping wedge 175. The forward curvature of the groove 205 and/or of the gripping edge 200 in the plane P3 allows the displaced material 230 to move or distribute rearwardly within the groove 205 as the amount of displaced material 230 increases as the first pipe 110 is urged rearward.

The combination of the curvature of the groove 205 and/or the gripping edge 200 in the plane P1, the plane P2, and/or the plane P3 enables the displaced material 230 to be further displaced circumferentially, or laterally, and axially relative to the gripping wedge 175 and the first pipe 110 such that the displaced material 230 is removed, relocated, and distributed from locations directly between the gripping wedge 175 and the first pipe 110 and such that the displaced material 230 does not create interference issues between the gripping wedge 175 and the first pipe 110, which as discussed above, would reduce the effectiveness and ability of the gripping wedge 175 to grip the first pipe 110. Furthermore, reducing or eliminating such interference issues and improving the ability of the gripping wedge 175 to grip the first pipe 110 allows for improved and more precise engagement of the gripping wedge 175 and promotes higher pressure resistance, which ultimately leads to a significantly higher pressure rating for the joint restraint 105.

In one or more embodiments, the first inner surface portion 195B1 may facilitate preventing over-rotation of the gripping wedge 175 during activation of the gripping wedge 175, which over-rotation could reduce the ability of the gripping edge 200 to grip the first pipe 110 or could cause the gripping wedge 175 to damage the first pipe 110. In one or more embodiments, as the gripping wedge 175 pivots about the gripping edge 200, the first inner surface portion 195B1 may contact the first pipe 110 such that further pivoting or rotation of the gripping wedge 175 about the gripping edge 200 is prevented.

Figure 4F:
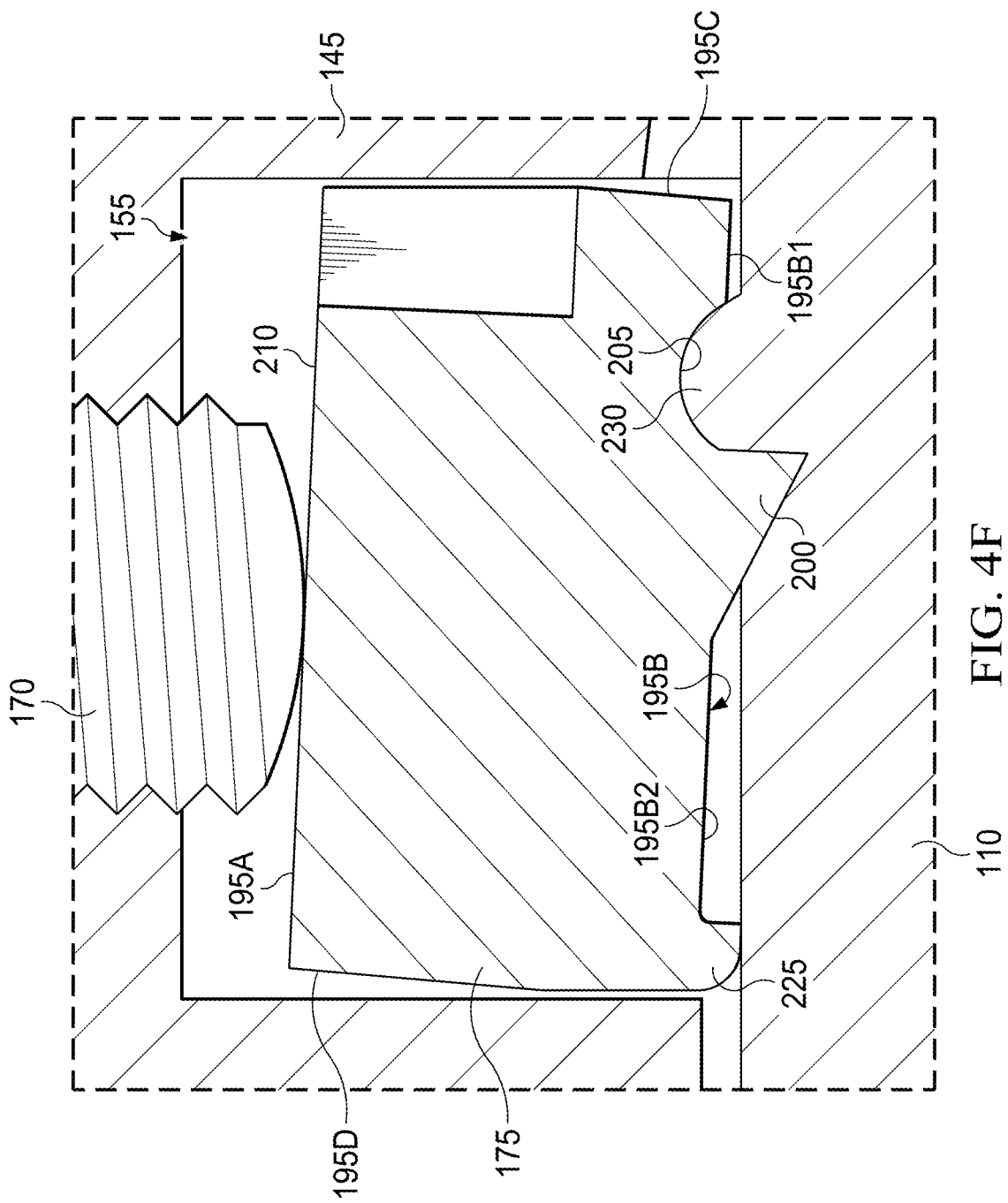
FIG. 4F illustrates an enlarged portion of the cross-sectional view of the joint restraint of FIG. 4E, according to one or more embodiments of the present disclosure.

FIG. 4F illustrates an enlarged view of portion 4F of the joint restraint system 100 of FIG. 4E, according to one or more embodiments.

Figure 5A:
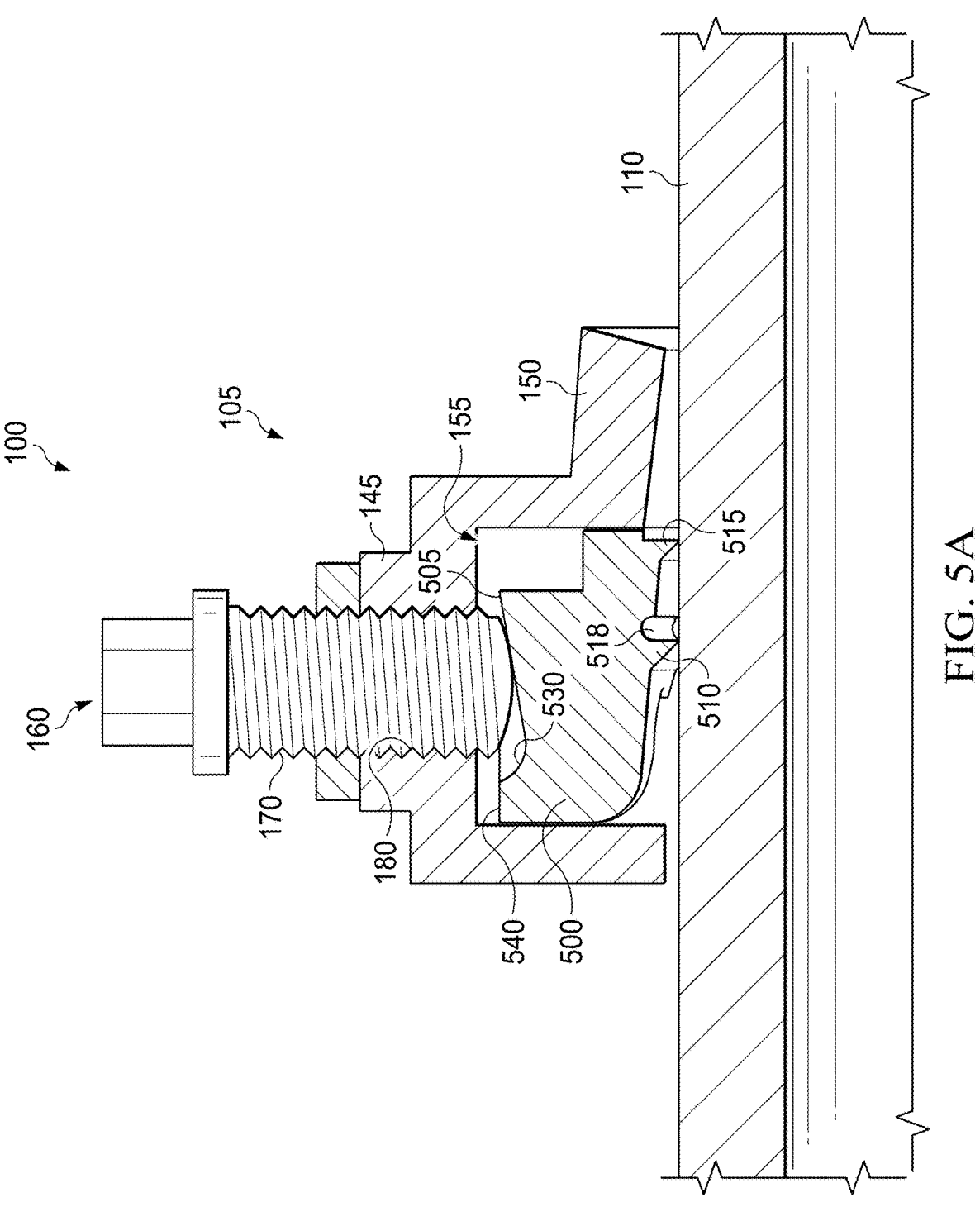
FIG. 5A illustrates a cross-sectional view of another embodiment of the joint restraint of FIG. 1 including another embodiment of the gripping wedge, the another embodiment of the joint restraint illustrated in a first configuration, according to one or more embodiments of the present disclosure.

FIG. 5A illustrates a portion of the joint restraint system 100 including a second embodiment of the gripping wedge, according to one or more embodiments. The second embodiment of the gripping wedge will be referred to as gripping wedge 500. In one or more embodiments, the gripping wedge 500 may include any one or more features or elements of the gripping wedge 175 as shown and described above with respect to FIGS. 1-4F. Similar features and elements between the gripping wedge 175 and the gripping wedge 500 are illustrated with the same reference numerals, however, this repetition is for the purpose of simplicity and clarity and does not in itself dictate a relationship between the various embodiments and/or configurations discussed.

As shown in FIGS. 1-4F, the ledge 210 of the gripping wedge 175 is flat. As described above, the ledge 210 of the gripping wedge 175 is in contact with the torque screw 170 during installation and activation of the wedge assembly 160 onto the first pipe 110. In one or more embodiments, after initially setting the wedge 175 with flat ledge 210 onto the first pipe 110 by torquing down the torque screw 170 via the twist-off nut 185, there may be no additional mechanical means of maintaining downward pressure on the wedge 175 to create sufficient shear force through penetration of the gripping edge 200 into the first pipe 110. In one or more embodiments, once the torque screw 170 is torqued and/or the wedge assembly 160 reaches full activation, there may be no additional downward pressure provided by the torque screw 170 to maintain or encourage the contact between the gripping edge 200 and the first pipe 110. In one or more embodiments, once the gripping wedge 175 pivots relative to the torque screw 170 and within the wedge assembly housing 155, the contact between the torque screw 170 and the gripping wedge 175 may be reduced, or at least may no longer be ideal, such that downward pressure on the flat ledge 210 of the gripping wedge 175 provided by the torque screw 170 is reduced. As a result, in such embodiments, when the first and second pipes are pressurized or when the pressure in the first and second pipes spikes, the gripping edge 200 may be prone to jumping, rotating, or slipping out of the surface of the first pipe 110. Thus, another aspect of the present disclosure addresses the issue of maintaining additional downward pressure on the gripping wedge 175 via the torque screw 170 during activation of the gripping wedge 175.

FIG. 5A illustrates the joint restraint system 100 including the gripping wedge 500 in a first configuration in which the joint restraint 105 is partially installed onto the first pipe 110, but the gripping wedge 500 is not yet activated. As shown in FIG. 5A, the wedge assembly 160 has been torqued down such that the twist-off nut 185 has been sheared off and such that the torque screw 170 is pressing the gripping wedge 500 against the first pipe 110 with an initial holding force. However, in the first configuration shown in FIG. 5A, the joint restraint system 100 is not yet pressurized and the gripping wedge 500 is not yet activated, meaning that the gripping edge of the gripping wedge 500 is not yet digging into and gripping the first pipe 110.

Figure 5B:
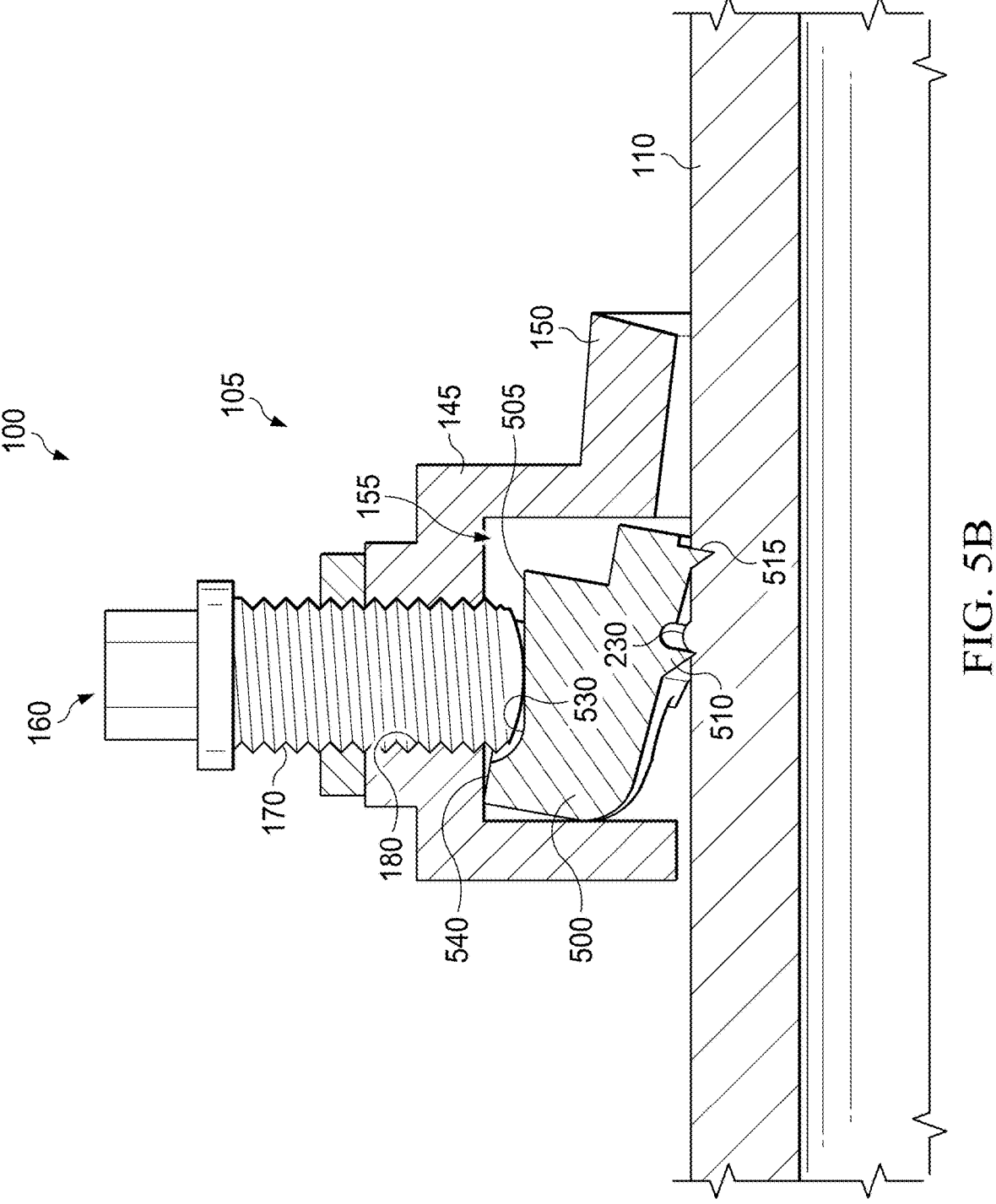
FIG. 5B illustrates a cross-sectional view of the joint restraint of FIG. 5A in a second configuration, according to one or more embodiments of the present disclosure.

As shown in FIG. 5A, in one or more embodiments, the gripping wedge 500 includes a ledge 505 similar to the ledge 210 of the gripping wedge 175 except that the ledge 505 of the gripping wedge 500 is inclined, which, as will be shown and described in more detail with respect to FIG. 5B, promotes improved contact between the torque screw 170 and the gripping wedge 500 once the gripping wedge 500 has pivoted during activation. As also shown in FIG. 5A, in one or more embodiments, the gripping wedge 500 includes a first gripping edge 510 and a second gripping edge 515 positioned on axially opposing sides of a groove 518. In one or more embodiments, the first gripping edge 510 may be substantially similar to gripping edge 200, including any one or more elements or features of the gripping edge 200. In the embodiment shown, the first and second gripping edges 515 are straight and are not curved in any direction.

FIG. 5B illustrates the joint restraint system 100 including the gripping wedge 500 in a second configuration in which the joint restraint system 100 is pressurized and the gripping wedge 500 beings to activate. As the first pipe 110 is pressurized, the first pipe 110 is forced rearward, or to the left in the illustration shown in FIG. 5B, relative to the gripping wedge 500 as the coupling of the first pipe 110 and the second pipe 115 is urged to separate under pressure. In one or more embodiments, the relative movement between the gripping wedge 500 and the first pipe 110, as well as the downward force placed upon the gripping wedge 500 by the torque screw 170, causes the first gripping edge 510 and the second gripping edge 515 of the gripping wedge 500 to dig into the first pipe 110. In one or more embodiments, the gripping wedge 500 may begin to pivot about the first gripping edge 510 and relative to the torque screw 170 due to the relative movement between the gripping wedge 500 and the first pipe 110, which pivoting motion facilitates further activation and engagement of the first and second gripping edges 515 and promotes the ability of the first and second gripping edges 515 to dig into the first pipe 110.

In one or more embodiments, the second gripping edge 515 penetrates the surface of the first pipe 110 before the first gripping edge 510 penetrates the surface of the first pipe 110. In the embodiment shown in FIG. 5B, the first pipe 110 is urged to the left when pressurized and the gripping wedge 500 pivots to the right, forward, or clockwise about the first gripping edge 510 and clockwise relative to the torque screw 170.

As shown in FIG. 5B, the torque screw 170 maintains improved contact with the ledge 505 after the gripping wedge 500 has pivoted due to the incline of the ledge 505. The incline of the ledge 505 is configured such that after the gripping wedge 500 pivots during activation, the torque screw 170 maintains contact with the ledge 505 at substantially a 90-degree angle, or tangentially, such that the torque screw 170 is able to maintain sufficient downward force on the gripping wedge 500, which may reduce or eliminate the incidence of slippage, and thus improves the performance of the joint restraint 105 with respect to maintaining the first and second pipes 110,115 coupled together.

Figure 6A:
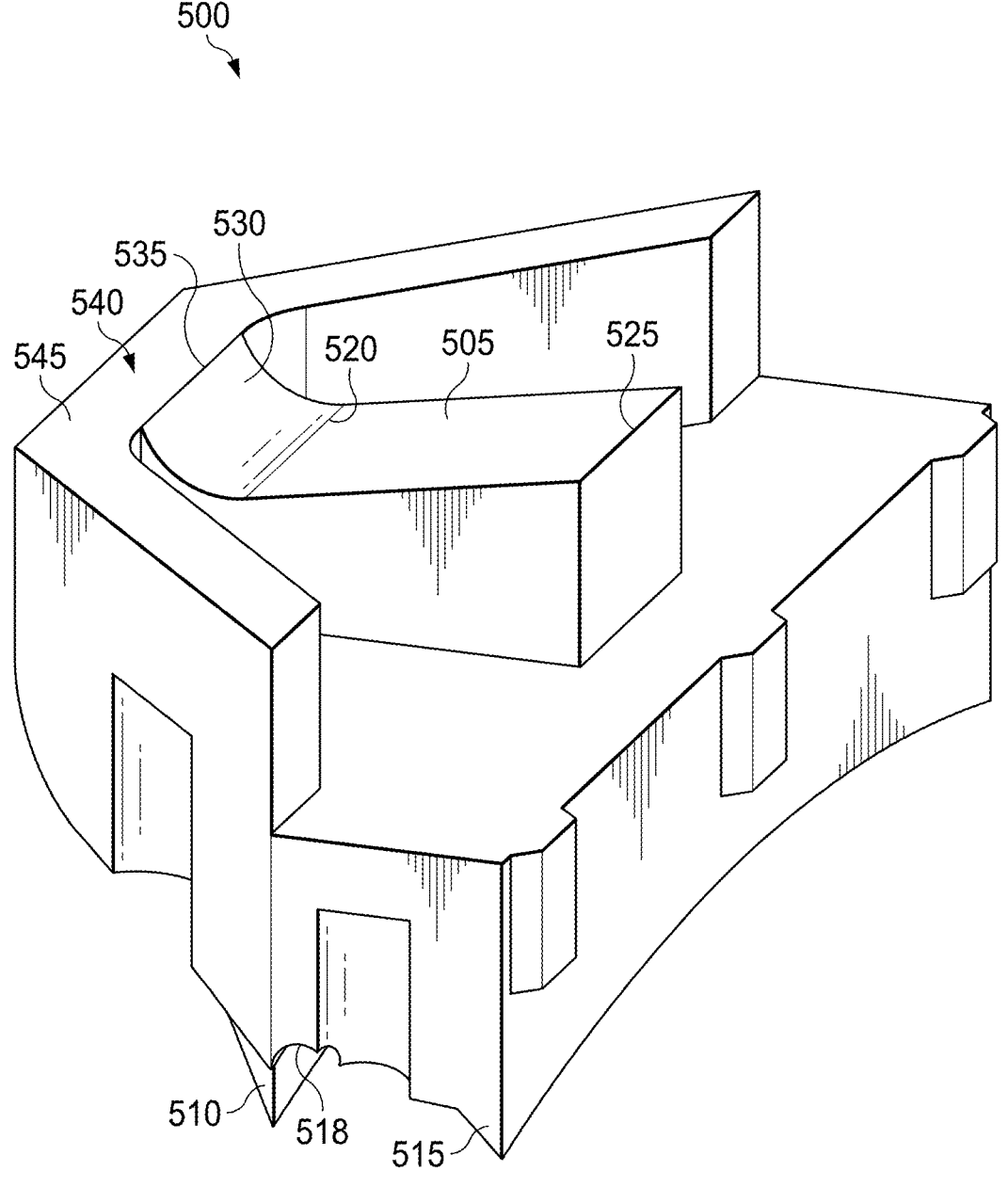
FIG. 6A illustrates a perspective view of the gripping wedge of the joint restraint of FIGS. 5A and 5B, according to one or more embodiments of the present disclosure.

FIG. 6A illustrates a top-front-left perspective view of the gripping wedge 500, according to one or more embodiments.

In the embodiment shown in FIG. 6A, the gripping wedge 500 includes ledge 505 which is contacted by the torque screw 170. The ledge 505 extends axially between a first edge 520 and a second edge 525, which are axially spaced apart along the gripping wedge 500. As shown, the second edge 525 is spaced radially outward of or radially above the first edge 520 such that the ledge 505 is inclined or extends along an inclined plane.

In one or more embodiments, a curved surface 530 or cradle is positioned adjacent to the ledge 505 at the first edge 520. In one or more embodiments, the ledge 505 includes the curved surface 530. In one or more embodiments, the curved surface 530 extends between the first edge 520 and an edge 535 of a rear wall 540 of the gripping wedge 500. In one or more embodiments, the curved surface 530 curves radially upward from the first edge 520 to the edge 535 of the rear wall 540. In one or more embodiments, the inclined ledge 505 and the curved surface 530 form a continuous and substantially L- or J-shaped surface. In one or more embodiments, the curved surface 530 terminates prior to reaching the edge 535 of the rear wall 540. In such embodiments, the curved surface 530 terminates into a substantially vertical surface of the rear wall 540, such vertical surface extending from the curved surface 530 to the edge 535 of the rear wall 540. In one or more embodiments, the curved surface 530 forms a portion of, or defines at least a portion of a surface of, the rear wall 540.

In one or more embodiments, when gripping wedge 500 pivots about the first gripping edge 510 as the gripping wedge 500 is activated during pressurization of the joint restraint system 100, the incline of the ledge 505 enables the torque screw 170 to continue making mechanical contact with the ledge 505 and to continue applying sufficient downward pressure or force on the gripping wedge 500 to maintain sufficient shear force between the gripping wedge 500 and the surface of the first pipe 110. In certain applications, this is an improvement over gripping wedges that include flat ledges because such flat ledges may not maintain sufficient mechanical contact with the torque screw 170 once the gripping wedge has pivoted during activation, and thus may not maintain sufficient shear force between the gripping wedge and the pipe to prevent slipping of the gripping wedge relative to the pipe. In one or more embodiments, the gripping wedge 175 shown in FIGS. 1-4F may include the inclined ledge 505.

In one or more embodiments, a top surface 545 of the rear wall 540 is flush with the second edge 525 such that the inclined ledge 505 does not extend radially above the rear wall 540.

In one or more embodiments, the rear wall 540 and/or the curved surface 530 prevents over-rotation of the gripping wedge 500. While it is desirable to maintain downward pressure on the gripping wedge 500 to prevent slippage of the first and second gripping edges 510,515 relative to the pipe, over-rotation of the gripping wedge 500 could lead to excessive penetration of the gripping edges 510,515 into the first pipe 110 or excessive downward force on the gripping wedge 500 that could damage, crack, or break the first pipe 110. As shown in FIG. 5B, as the gripping wedge 500 pivots about the first gripping edge 510 and rotates relative to the torque screw 170, the rear wall 540 and/or curved surface 530 rotate toward the torque screw 170 and/or toward an interior surface of a radially outer wall of the wedge assembly housing 155 in which the gripping wedge 500 is positioned. After a certain amount of rotation, the rear wall 540 and/or the curved surface 530 contacts the torque screw 170 and/or the interior surface of the radially outer wall of the wedge assembly housing 155, which contact prevents further rotation (or over-rotation) of the gripping wedge 500.

In one or more embodiments, as the gripping wedge 500 rotates relative to the torque screw 170, the top surface 545 of the rear wall 540 may contact the interior surface of the radially outer wall of the wedge assembly housing 155 such that further rotation of the gripping wedge 500 is stopped. In one or more embodiments, as the gripping wedge 500 rotates relative to the torque screw 170, the edge 535 of the rear wall 540 may contact the torque screw 170 such that further rotation of the gripping wedge 500 is stopped. In one or more embodiments where the rear wall 540 includes a substantially vertical or radially extending surface between the edge 535 and the curved surface 530, as the gripping wedge 500 rotates relative to the torque screw 170, the vertical surface of the rear wall 540 may contact the torque screw 170 such that further rotation of the gripping wedge 500 is stopped.

In one or more embodiments, as the gripping wedge 500 rotates relative to the torque screw 170, a bottom portion of the torque screw 170 seats into or is received by the curved surface 530 of the gripping wedge 500, which facilitates smooth rotation and cooperation between the gripping wedge 500 and the torque screw 170, and which facilitates the activation of the gripping wedge 500. In one or more embodiments, the curved surface 530 permits or facilitates a greater and smoother range of rotation of the gripping wedge 500 relative to the torque screw 170. In one or more embodiments, the contact between the curved surface 530 and the torque screw 170 prevents further rotation of the gripping wedge 500.

In one or more embodiments, the degree of rotation (or degree of over-rotation) of the gripping wedge 500 can be controlled by adjusting the radius of curvature of the curved surface 530 and/or by adjusting the radial (or vertical) height of the rear wall 540. In one or more embodiments, the smaller the radius of curvature of the curved surface 530, the lesser the degree of rotation of the gripping wedge 500, or in other words, the less the gripping wedge 500 will be able to rotate before the curved surface 530 contacts the torque screw 170 such that further rotation is stopped. In one or more embodiments, the greater the radial height of the rear wall 540, the lesser the degree of rotation of the gripping wedge 500, or in other words, the less the gripping wedge 500 will be able to rotate before the rear wall 540 contacts the torque screw 170 and/or the wedge assembly housing 155 such that further rotation is stopped.

Figure 6B:
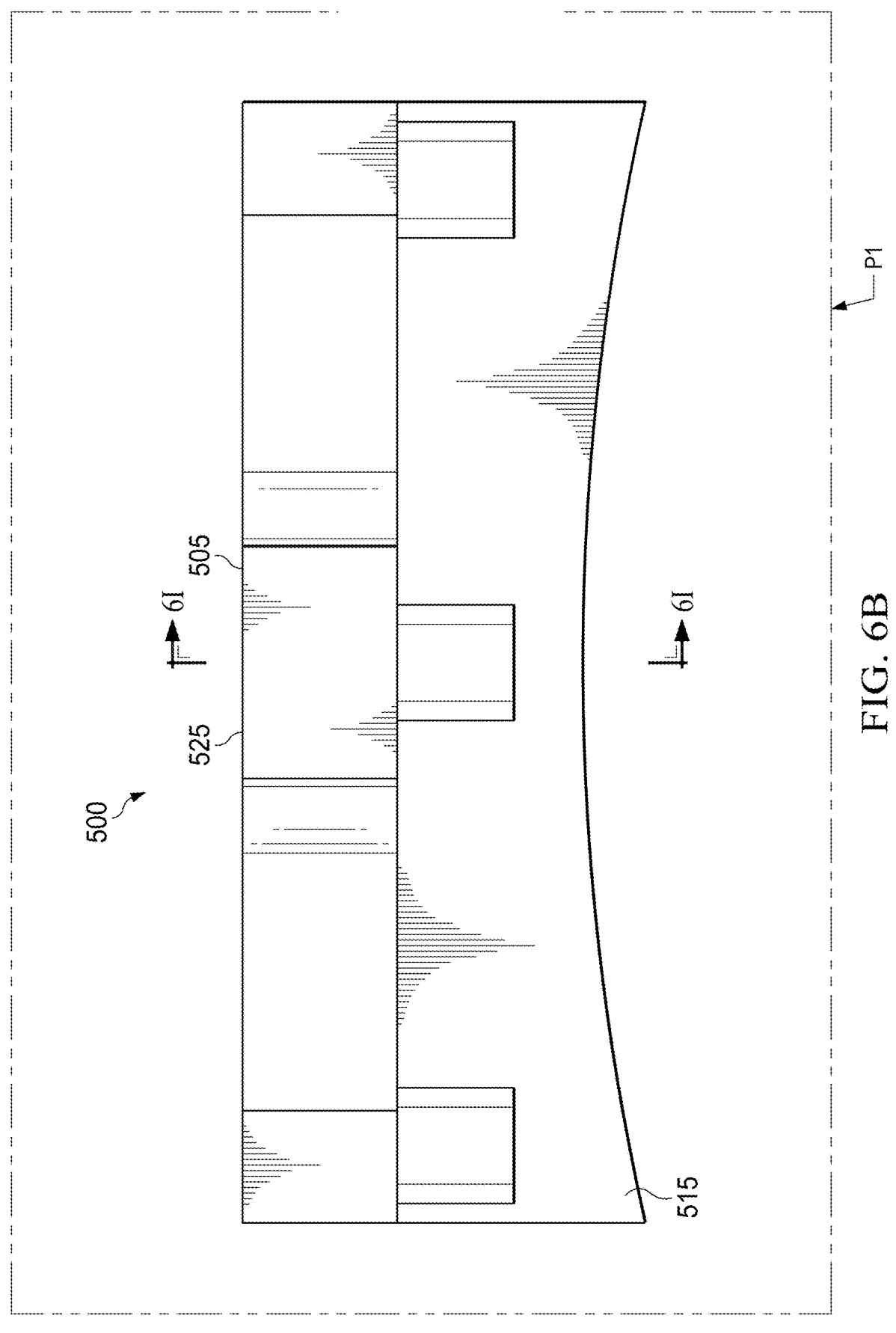
FIG. 6B illustrates a front elevational view of the gripping wedge of the joint restraint of FIGS. 5A and 5B, according to one or more embodiments of the present disclosure.

FIG. 6B illustrates a front elevational view of the gripping wedge 500, according to one or more embodiments.

Figure 6C:
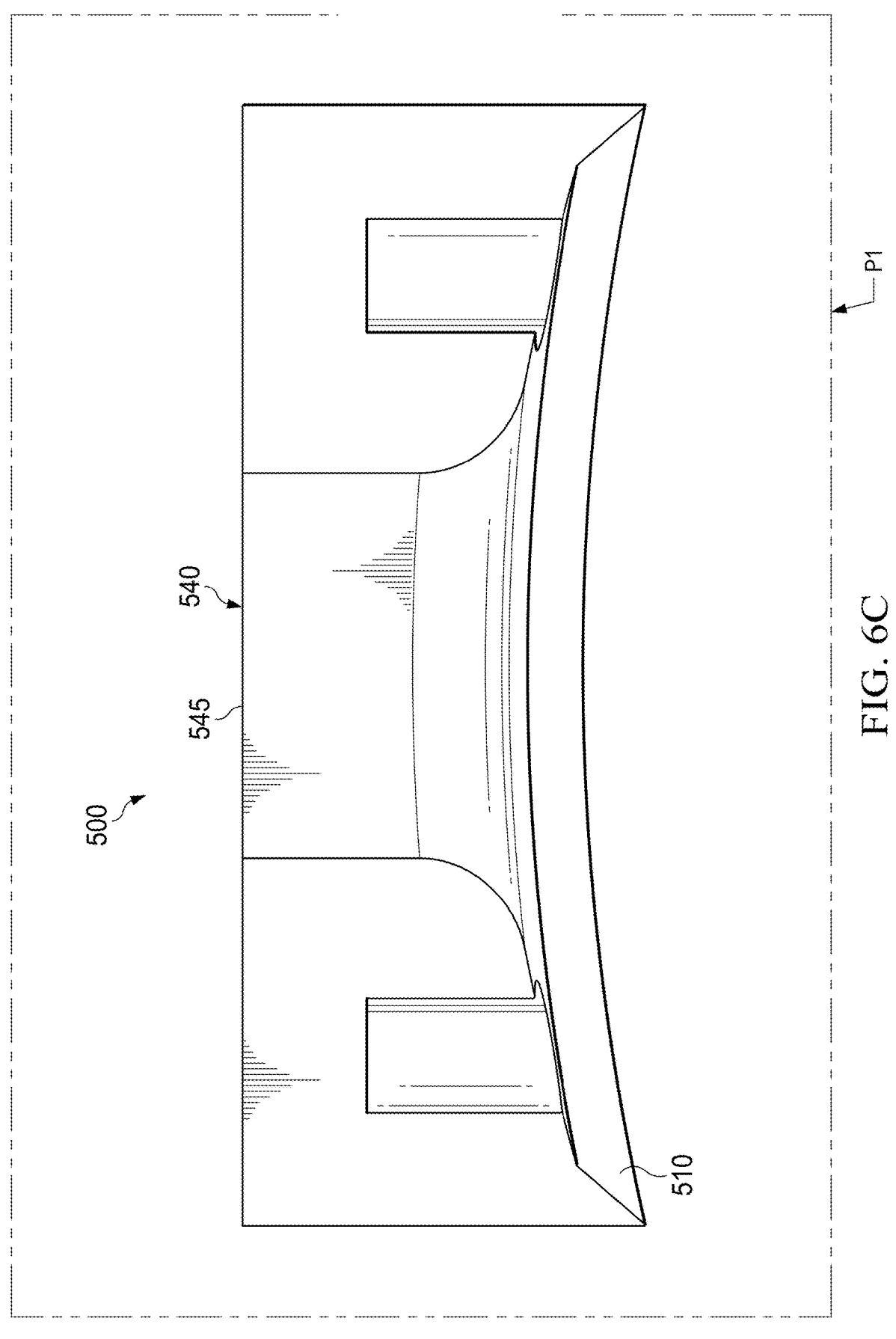
FIG. 6C illustrates a rear elevational view of the gripping wedge of the joint restraint of FIGS. 5A and 5B, according to one or more embodiments of the present disclosure.

FIG. 6C illustrates a rear elevational view of the gripping wedge 500, according to one or more embodiments.

Figure 6D:
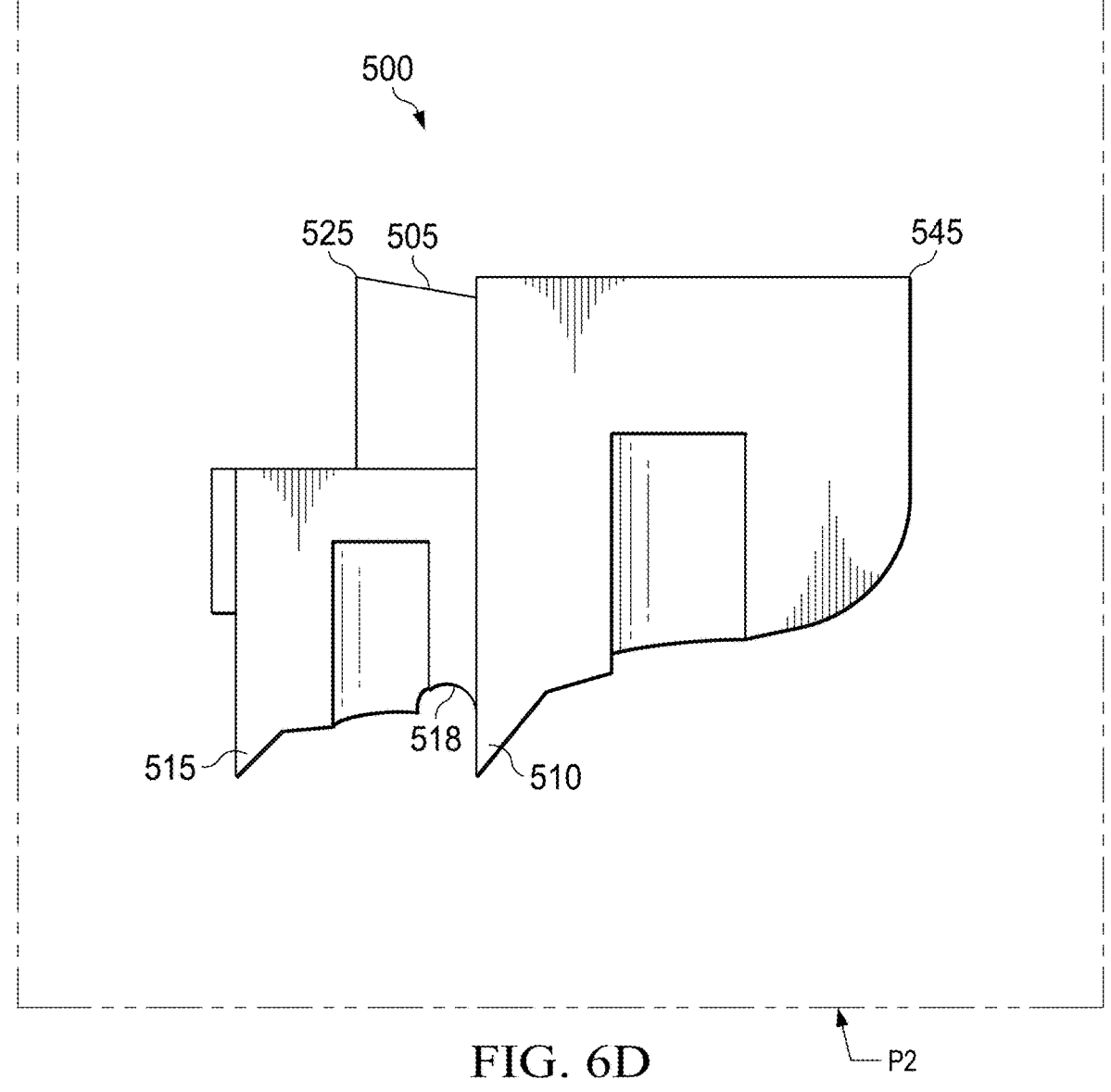
FIG. 6D illustrates a right side elevational view of the gripping wedge of the joint restraint of FIGS. 5A and 5B, according to one or more embodiments of the present disclosure.

FIG. 6D illustrates a right-side elevational view of the gripping wedge 500, according to one or more embodiments.

Figure 6E:
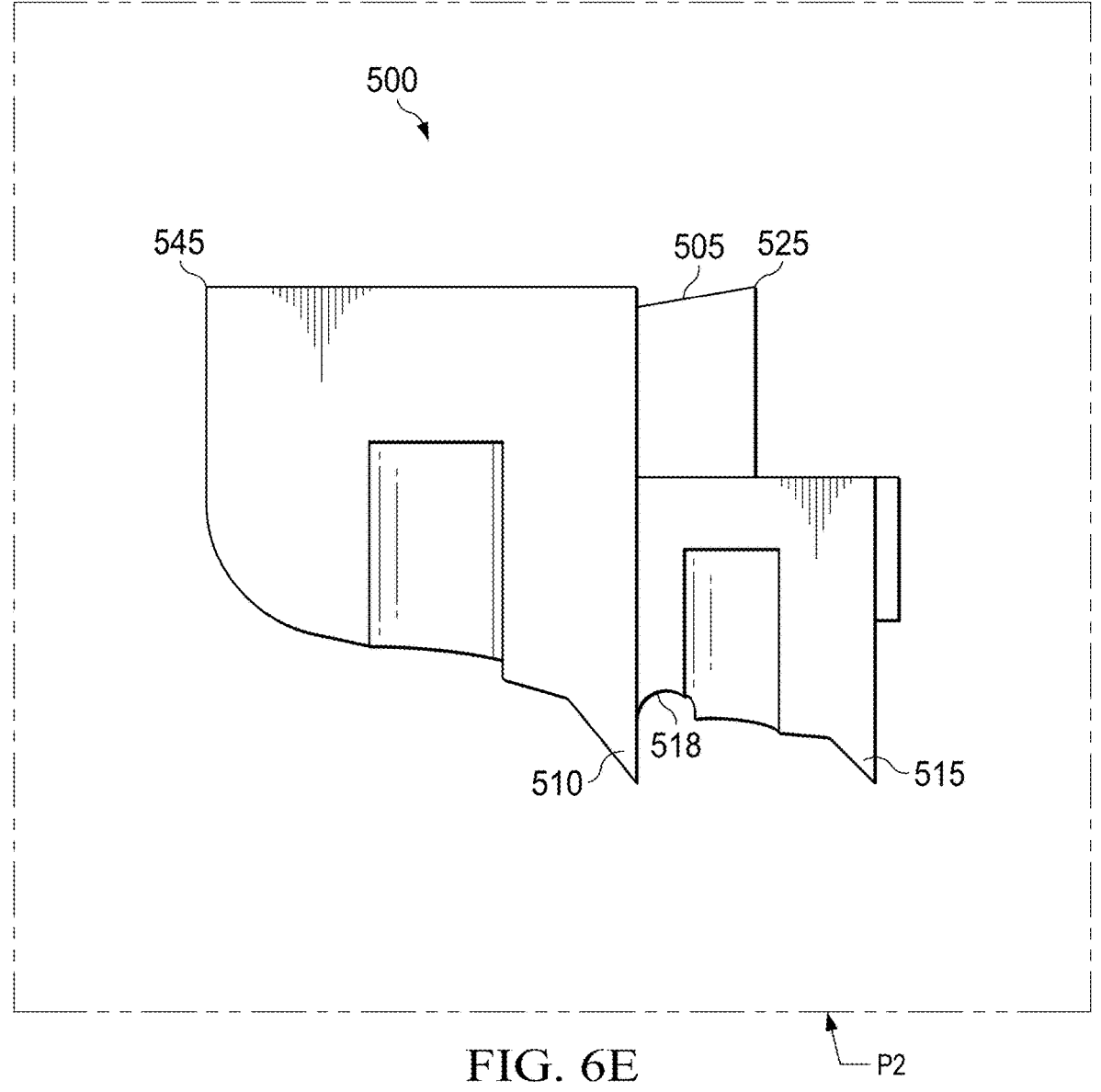
FIG. 6E illustrates a left side elevational view of the gripping wedge of the joint restraint of FIGS. 5A and 5B, according to one or more embodiments of the present disclosure.

FIG. 6E illustrates a left-side elevational view of the gripping wedge 500, according to one or more embodiments.

Figure 6F:
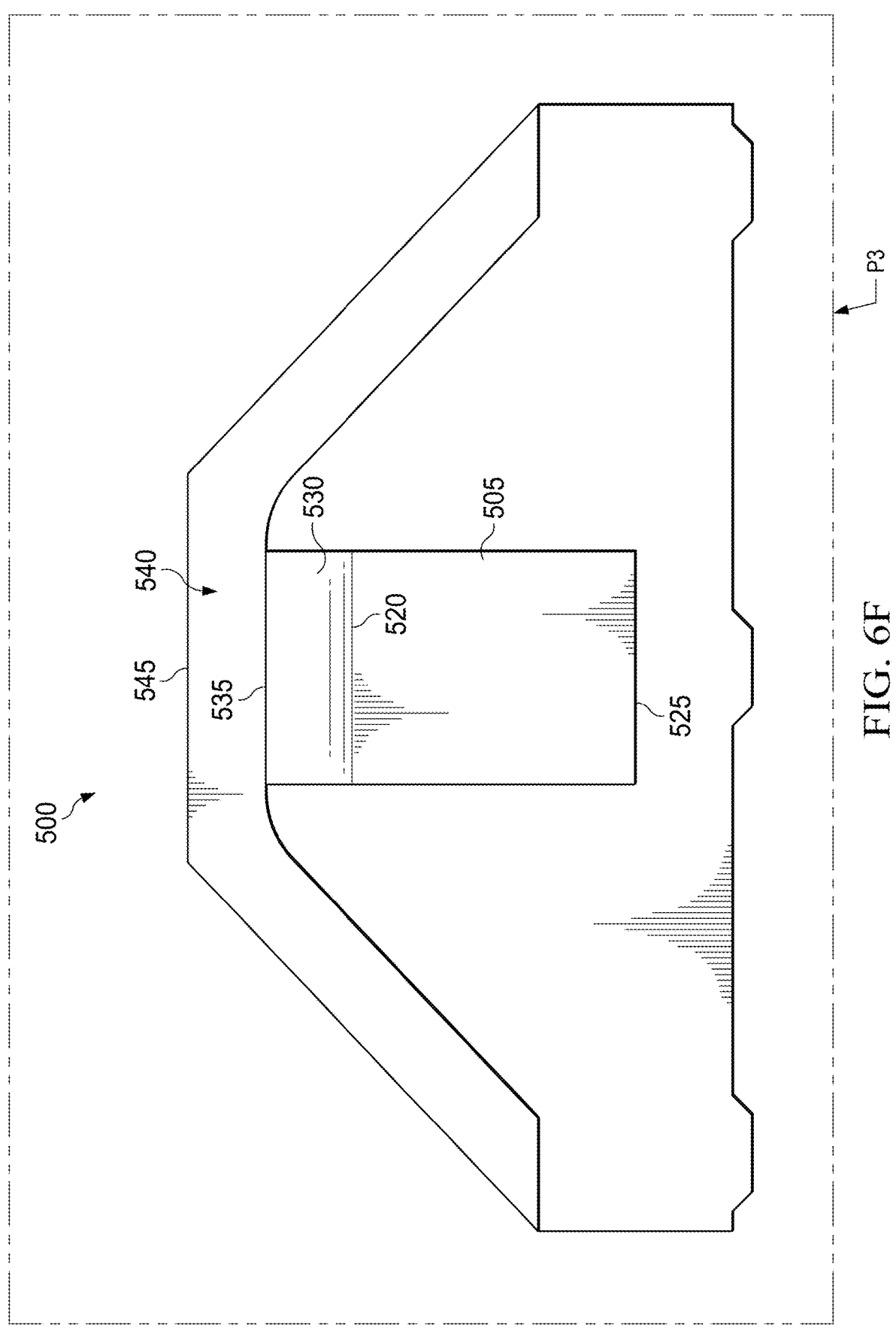
FIG. 6F illustrates a top plan view of the gripping wedge of the joint restraint of FIGS. 5A and 5B, according to one or more embodiments of the present disclosure.

FIG. 6F illustrates a top plan view of the gripping wedge 500, according to one or more embodiments.

Figure 6G:
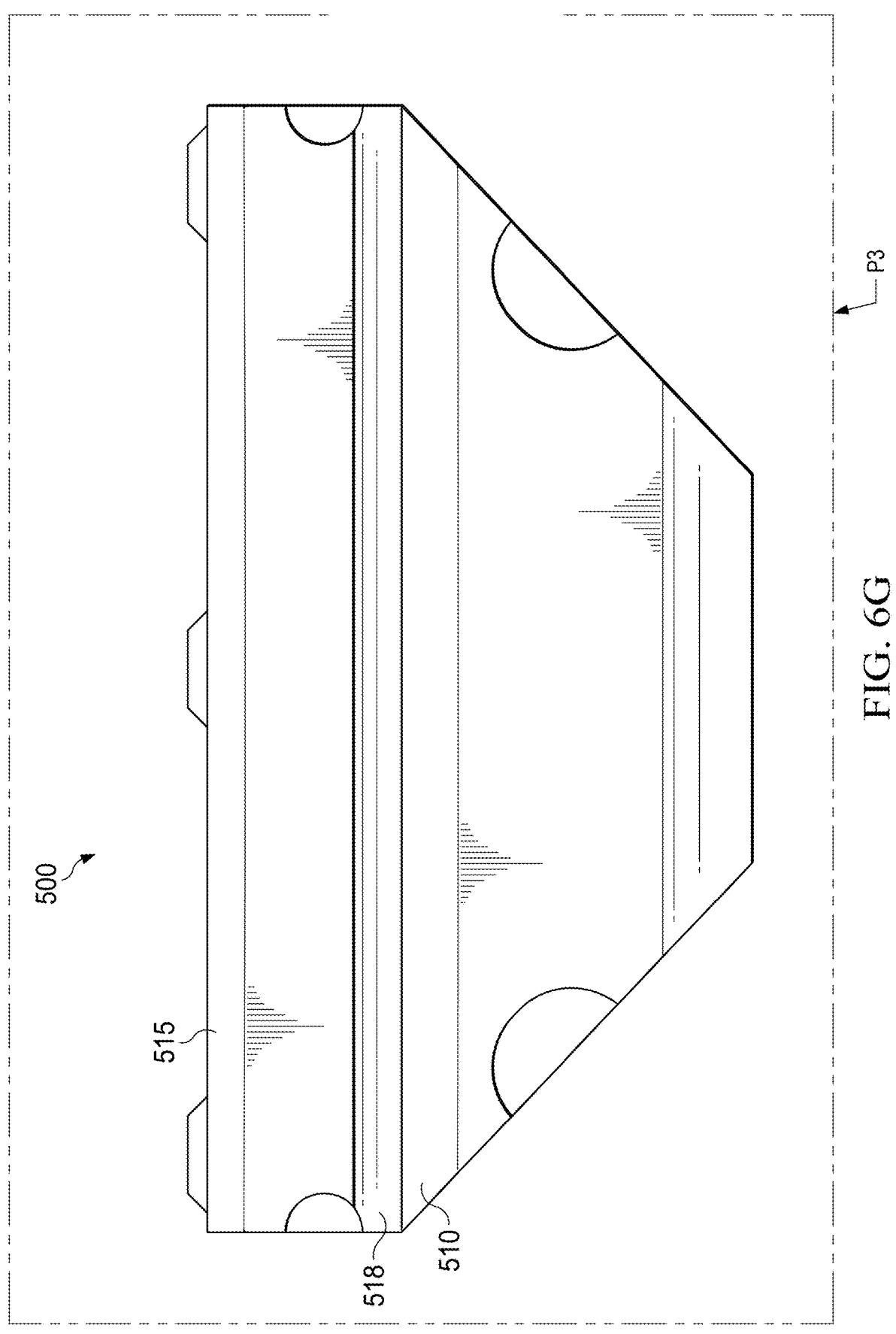
FIG. 6G illustrates a bottom plan view of the gripping wedge of the joint restraint of FIGS. 5A and 5B, according to one or more embodiments of the present disclosure.

FIG. 6G illustrates a bottom plan view of the gripping wedge 500, according to one or more embodiments.

Figure 6H:
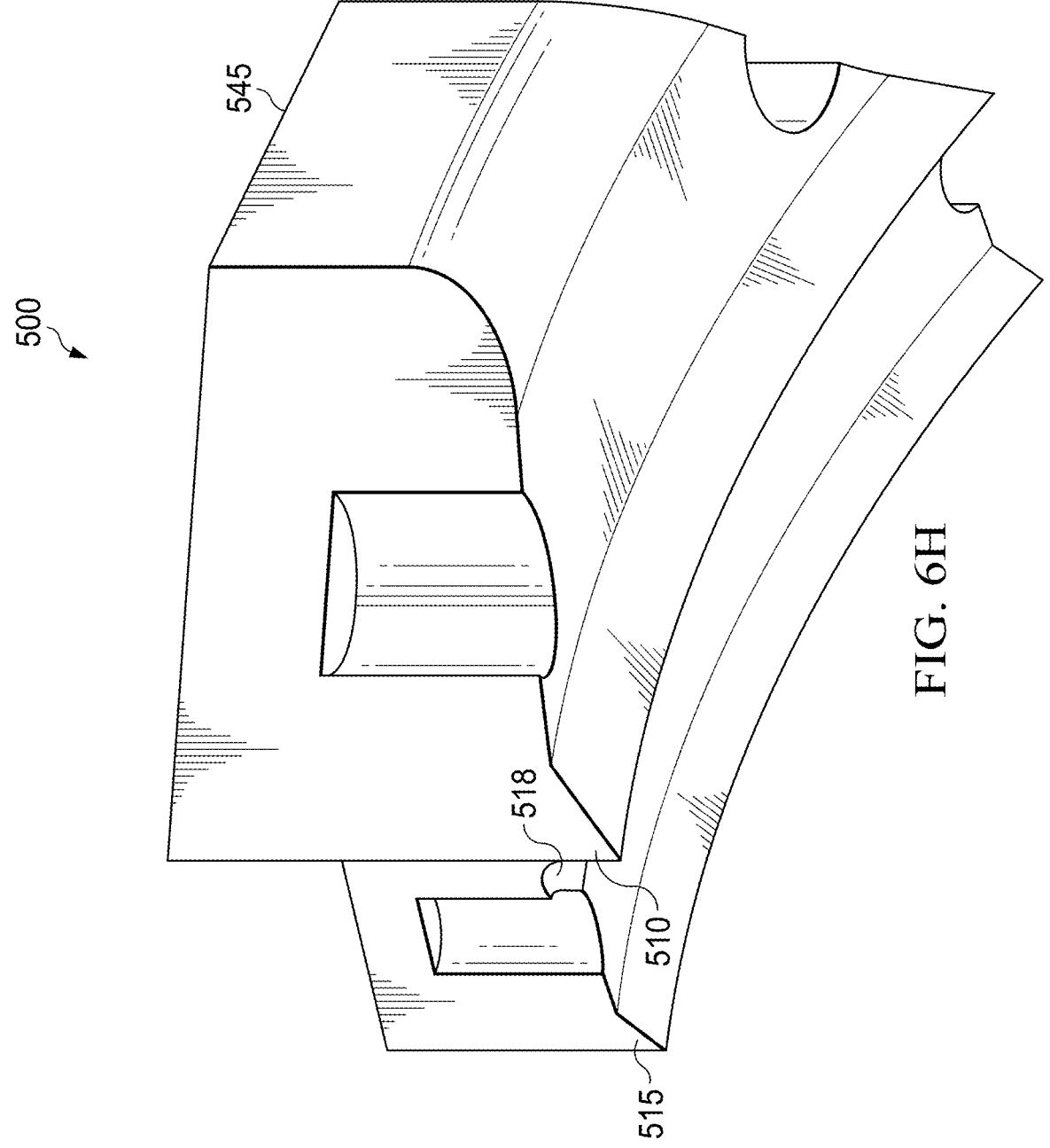
FIG. 6H illustrates another perspective view of the gripping wedge of the joint restraint of FIGS. 5A and 5B, according to one or more embodiments of the present disclosure.

FIG. 6H illustrates a bottom-rear-right perspective view of the gripping wedge 500, according to one or more embodiments.

Figure 6I:
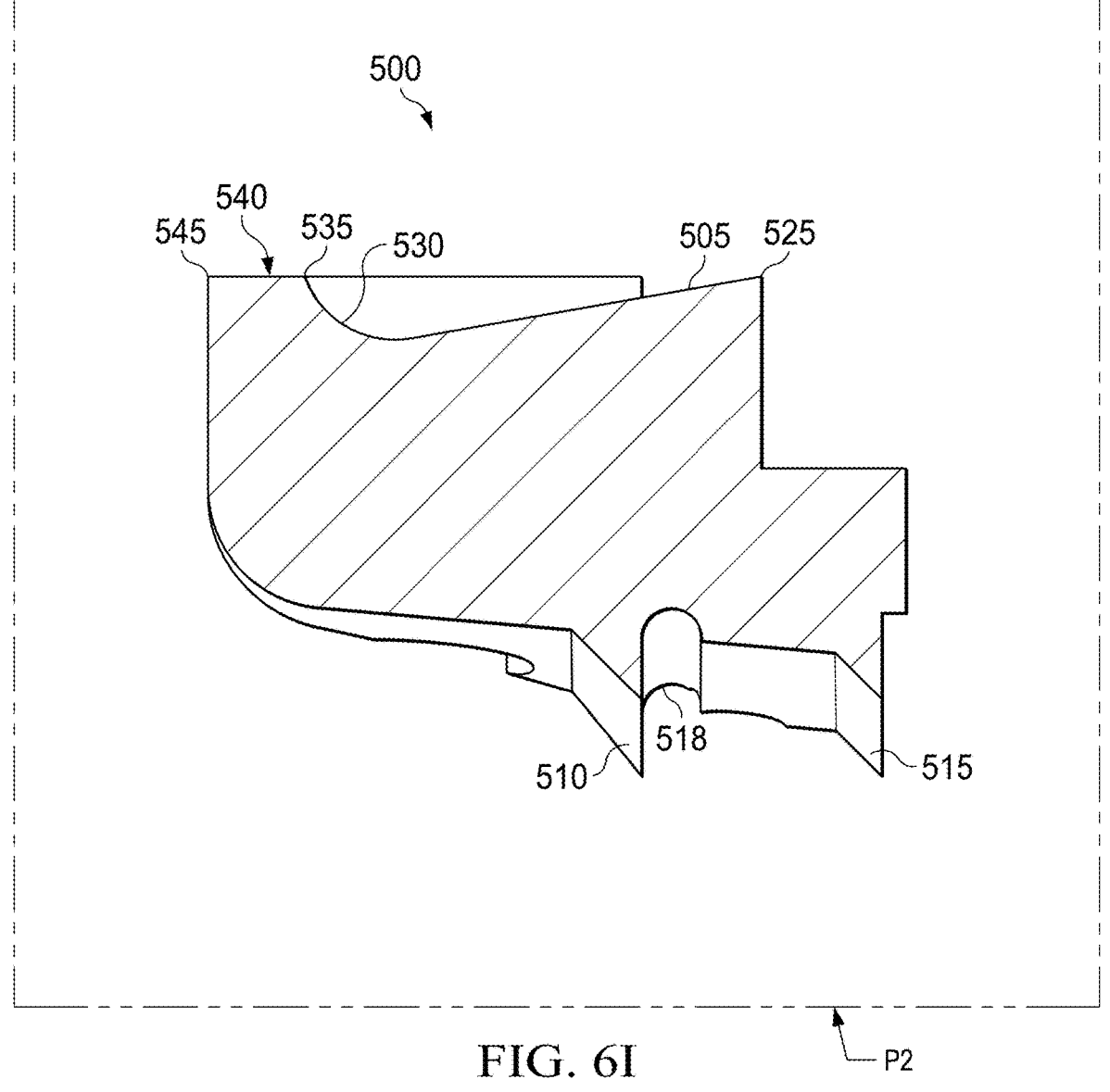
FIG. 6I illustrates a cross-sectional view of the gripping wedge of the joint restraint of FIGS. 5A and 5B, according to one or more embodiments of the present disclosure.

FIG. 6I illustrates a cross-sectional view of the gripping wedge 500, according to one or more embodiments. As shown in FIG. 6I, the ledge 505 may be inclined in the plane P2, which may be the same plane P2 as described with respect to the gripping wedge 175. In one or more embodiments, the curved surface 530 may also extend in the plane P2. In one or more embodiments, where the ledge 505 includes the curved surface 530, the ledge 505 may be curved in the plane P2.

In one or more embodiments, the elements of the gripping wedge 500 described above, particularly the inclined ledge 505, the curved surface 530, and the rear wall 540, may be applied to any one or more gripping wedge designs where increased downward pressure from mechanical contact with a torque screw 170 would be desirable. In one or more embodiments, such elements may be combined with a gripping wedge configured to pivot within a wedge assembly housing 155 and relative to a torque screw 170, or which may be configured to be wedged via a sliding engagement within the wedge assembly housing 155 between a torque screw 170 and a pipe. In wedging applications, the rear wall 540 may prevent the torque screw 170 from sliding too far along the gripping wedge or from sliding off the gripping wedge.

When gripping ductile iron, steel and plastic pipe for the purpose of joint restraint, it is desirable to penetrate the surface of the outer wall of the pipe with a tooth-like projection, thereby transferring the axial force to be restrained to the pipe wall in a manner of mechanical interference creating shear and a tooth impression. In one or more embodiments, three things happen during activation of the gripping wedge: (1) a groove is cut, or more accurately pushed, into the surface of a pipe; (2) a portion of the material of the pipe is displaced by the tooth-like projection of the gripping wedge as the gripping wedge penetrates or is pushed into the pipe, which penetration of the tooth and displacement of the material forms the groove or impression in the surface of the pipe; and (3) the now embedded tooth-like projection provides positive anchorage and efficient transfer of force resisted by the material shear strength of the pipe material. As described above, a common problem in the technical field is maintaining a constant or increasing downward force as pressure increases within the associated piping system. The present disclosure provides systems, methods, and apparatuses that improve the application of such downward force and the transfer of that force to the gripping wedge, and ultimately to the tooth-like projection of the gripping wedge, such that performance and pressure ratings of the associated systems, methods, and apparatuses is improved.

Existing gripping wedges, and manufactures of such gripping wedges, have been challenged by the need to create sufficient shear force by wedge penetration as described above, while maintaining downward pressure to the tooth-like projections of the gripping wedges. Gripping wedges having flat ledges may have limited means for providing mechanical downward pressure other than the actuating screw for initial pressure. Screw torque is somewhat hard to maintain accurately, and hard to physically torque enough to maintain sufficient downward pressure to reach acceptable pressure ratings on all pipe materials. In many applications, once a torque screw has reached its initial torque value for setting the gripping wedge, the torque screw can no longer be torqued further as the head of the torque breaks off at the predetermined torque value. Some existing gripping wedges have been limited in their pressure capabilities (e.g., pressure in the piping system) by its means to increase shear being impeded by the wedge tooth jumping, rotating, or being impacted out of the wedge groove. Furthermore, manufacturers of gripping wedges have also been challenged by interference issues caused by the creation of displaced material from the surface of the pipe during activation of the gripping wedge and subsequent failure to remove or displace such displaced material.

The present disclosure provides an improved gripping wedge that keeps the tooth positively in the wedge groove or wedge buttress under high pressure, pressure spikes, and impact events. Providing the inclined ledge on the gripping wedge promotes firm contact and maintained downward pressure between the torque screw and the gripping wedge after activation of the gripping wedge, which promotes increased grip strength and pressure ratings. The curved surface associated with the inclined ledge locks the gripping wedge into position such that even when fully actuated, the tooth-like projection of the gripping wedge experiences sufficient downward force to positively lock the tooth-like projection into the surface of the pipe. The incline plane also facilitates optimal positioning of the gripping wedge during activation and allows the initial groove in the surface of the pipe to be cold formed at much lower torques. Also, providing a groove and gripping edge of the gripping wedge that are curved in two planes that are perpendicular, or substantially perpendicular, to each other as described above promotes removal, relocation, and distribution of the displaced material created during activation of the gripping wedge such that the displaced material does not remain directly between the gripping wedge and the pipe where such displaced material could create interference issues that compromise the gripping wedges ability to grip the pipe.

It is understood that one or more of the embodiments described above and shown FIGS. 1-6I may be combined in whole or in part with one or more of the embodiments described above and shown in FIGS. 1-6I. For example, in one or more embodiments, the ledge 210 of the gripping wedge 175 may include any one or more features or elements of the ledge 505 of gripping wedge 500, including the first edge 520, the second edge 525, the curved surface 530, and the edge 535, and the gripping wedge 175 may further include the rear wall 540 and the top surface 545.

The present disclosure introduces a gripping wedge for a pipe joint restraint, the gripping wedge including: a first surface extending in a first plane; a groove formed in the first surface, the groove having first and second curvatures; wherein the first curvature extends in the first plane; wherein the second curvature extends in a second plane; and wherein the second plane is perpendicular to the first plane; and a first projection at least a portion of which is offset from the first surface in a direction perpendicular to the first plane; wherein the first projection is adjacent the groove such that, in the first plane, at least a portion of the groove is positioned between the first projection and the first surface; wherein the first projection has third and fourth curvatures; wherein the third curvature of the first projection is coaxial with the first curvature of the groove; wherein the fourth curvature of the first projection extends in a third plane; wherein the third plane is perpendicular to each of the first and second planes; and wherein the first projection is adapted to dig into a pipe being restrained by the pipe joint restraint. In one or more embodiments, the extension of the fourth curvature of the first projection, in the third plane that is perpendicular to each of the first and second planes, opposes the curvature of the pipe. In one or more embodiments, the opposing curvatures of the pipe and the first projection provide gap(s) between the first projection and the pipe adapted to receive material displaced from the pipe when the first projection digs into the pipe. In one or more embodiments, the groove is adapted to receive material displaced from the pipe when the first projection digs into the pipe. In one or more embodiments, the third curvature of the first projection extends in the first plane that is perpendicular to each of the second and third planes. In one or more embodiments, the groove includes a fifth curvature extending in the third plane that is perpendicular to each of the first and second planes. In one or more embodiments, the gripping wedge further includes a ledge opposing the first surface in the first plane and adapted to be engaged by a fastener of the pipe joint restraint to urge the gripping wedge, including the first projection, against the pipe. In one or more embodiments, the ledge is inclined in the second plane that is perpendicular to each of the first and third planes. In one or more embodiments, the gripping wedge further includes a second projection at least a portion of which is offset from the first surface in a direction perpendicular to the first plane; wherein the second projection is adjacent the first surface such that, in the first plane, the at least a portion of the groove is positioned between the first projection and the second projection. In one or more embodiments, the second projection has fifth and sixth curvatures; the fifth curvature of the second projection is coaxial with the first curvature of the groove and with the third curvature of the first projection; and the sixth curvature of the second projection extends in the third plane that is perpendicular to each of the first and second planes. In one or more embodiments, the second projection is adjacent the first surface such that, in the first plane, at least a portion of the first surface is positioned between the groove and second projection. In one or more embodiments, the gripping wedge further includes: a second surface extending in the first plane; wherein the second surface is adjacent the first projection opposite the groove such that, in the first plane, at least a portion of the first projection is positioned between the second surface and the groove; and a third projection at least a portion of which is offset from the first and second surfaces in a direction perpendicular to the first plane; wherein the third projection is adjacent the second surface opposite the first projection such that, in the first plane, at least a portion of the second surface is positioned between the first and third projections. In one or more embodiments, the third projection is adapted to urge the gripping wedge to pivot about the first projection. In one or more embodiments, the gripping wedge further includes: a third surface adjacent to the first surface and extending in the second plane that is perpendicular to each of the first and third planes such that the third surface extends perpendicular to the first surface; and a channel formed in the third surface; wherein the channel includes a seventh curvature extending in the first plane; wherein the channel is adapted to receive an adhesive; and wherein the adhesive is adapted to retain the gripping wedge within the pipe joint restraint.

The present disclosure also introduces a restraint apparatus for a pipe joint, the restraint apparatus including: a joint restraint comprising a housing; a fastener engaged with the joint restraint, the fastener comprising a distal end portion adapted to be received within the housing of the joint restraint; and a gripping wedge received within the housing of the joint restraint and adapted to be engaged by the distal end portion of the fastener; wherein the gripping wedge comprises: a first surface; a groove formed in the first surface, the groove having first and second curvatures; wherein the first curvature extends in a first plane; wherein the second curvature extends in a second plane; and wherein the second plane is perpendicular to the first plane; a projection at least a portion of which is offset from the first surface; wherein the projection is adjacent the groove so that at least a portion of the groove is positioned between the projection and the first surface; wherein the projection has a third curvature; wherein the third curvature of the projection is coaxial with the first curvature of the groove; and wherein the projection is adapted to dig into a pipe being restrained by the restraint apparatus; and an inclined ledge opposing the first surface in the first plane and adapted to be engaged by the distal end portion of the fastener; wherein the inclined ledge defines a fourth curvature, the fourth curvature extending within the second plane; and wherein the inclined ledge, including the fourth curvature, permits the gripping wedge to pivot, about the distal end portion of the fastener as the projection digs into the pipe being restrained by the restraint apparatus, and prevents, or at least resists, over-rotation of the gripping wedge. In one or more embodiments, the at least a portion of the projection is radially offset from the first surface. In one or more embodiments, the first surface extends in a third plane that is perpendicular to each of the first and second planes; and the at least a portion of the projection is offset from the first surface in a direction perpendicular to the first plane and in a direction perpendicular to the third plane. In one or more embodiments, the at least a portion of the groove is positioned between the projection and the first surface in the third plane. In one or more embodiments, the projection further includes a fifth curvature; and the fifth curvature of the projection extends in the third plane. In one or more embodiments, the at least a portion of the groove is positioned between the projection and the first surface in the second plane.

It is understood that variations may be made in the foregoing without departing from the scope of the present disclosure.

In several embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several embodiments, while different steps, processes, and procedures are described as appearing as distinct acts, one or more of the steps, one or more of the processes, and/or one or more of the procedures may also be performed in different orders, simultaneously and/or sequentially.

In several embodiments, the steps, processes, and/or procedures may be merged into one or more steps, processes and/or procedures.

In several embodiments, one or more of the operational steps in each embodiment may be omitted.

Moreover, in some instances, some features of the present disclosure may be employed without a corresponding use of the other features.

Moreover, one or more of the embodiments disclosed above, or variations thereof, may be combined in whole or in part with any one or more of the other embodiments described above, or variations thereof.

Moreover, one or more of the embodiments disclosed above, or variations thereof, may be combined in whole or in part with any one or more of the other embodiments described above, or variations thereof.

Although various embodiments have been disclosed in detail above, the embodiments disclosed are exemplary only and are not limiting, and those skilled in the art will readily appreciate that many other modifications, changes, and substitutions are possible in the embodiments without materially departing from the novel teachings and advantages of the present disclosure. Accordingly, all such modifications, changes, and substitutions are intended to be included within the scope of this disclosure as defined in the following claims. In the claims, means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A gripping wedge for a pipe joint restraint, the gripping wedge comprising:
    a first surface extending in a first plane;
    a groove formed in the first surface, the groove having first and second curvatures;
        wherein the first curvature extends in the first plane;
        wherein the second curvature extends in a second plane; and
        wherein the second plane is perpendicular to the first plane; and
    a first projection at least a portion of which is offset from the first surface in a direction perpendicular to the first plane;
        wherein the first projection is adjacent the groove such that, in the first plane, at least a portion of the groove is positioned between the first projection and the first surface;
        wherein the first projection has third and fourth curvatures;
        wherein the third curvature of the first projection is coaxial with the first curvature of the groove;
        wherein the fourth curvature of the first projection extends in a third plane;
        wherein the third plane is perpendicular to each of the first and second planes; and
        wherein the first projection is adapted to dig into a pipe being restrained by the pipe joint restraint.

2. The gripping wedge of claim 1, wherein the extension of the fourth curvature of the first projection, in the third plane that is perpendicular to each of the first and second planes, opposes the curvature of the pipe.

3. The gripping wedge of claim 2, wherein the opposing curvatures of the pipe and the first projection provide gap(s) between the first projection and the pipe adapted to receive material displaced from the pipe when the first projection digs into the pipe.

4. The gripping wedge of claim 1, wherein the groove is adapted to receive material displaced from the pipe when the first projection digs into the pipe.

5. The gripping wedge of claim 1, wherein the third curvature of the first projection extends in the first plane that is perpendicular to each of the second and third planes.

6. The gripping wedge of claim 1, wherein the groove includes a fifth curvature extending in the third plane that is perpendicular to each of the first and second planes.

7. The gripping wedge of claim 1, further comprising:
a ledge opposing the first surface in the first plane and adapted to be engaged by a fastener of the pipe joint restraint to urge the gripping wedge, including the first projection, against the pipe.

8. The gripping wedge of claim 7,
wherein the ledge is inclined in the second plane that is perpendicular to each of the first and third planes.

9. The gripping wedge of claim 1, further comprising:
a second projection at least a portion of which is offset from the first surface in a direction perpendicular to the first plane;
wherein the second projection is adjacent the first surface such that, in the first plane, the at least a portion of the groove is positioned between the first projection and the second projection.

10. The gripping wedge of claim 9,
wherein the second projection has fifth and sixth curvatures;
wherein the fifth curvature of the second projection is coaxial with the first curvature of the groove and with the third curvature of the first projection; and
wherein the sixth curvature of the second projection extends in the third plane that is perpendicular to each of the first and second planes.

11. The gripping wedge of claim 9,
wherein the second projection is adjacent the first surface such that, in the first plane, at least a portion of the first surface is positioned between the groove and second projection.

12. The gripping wedge of claim 1, further comprising:
a second surface extending in the first plane;
wherein the second surface is adjacent the first projection opposite the groove such that, in the first plane, at least a portion of the first projection is positioned between the second surface and the groove; and
a third projection at least a portion of which is offset from the first and second surfaces in a direction perpendicular to the first plane;
wherein the third projection is adjacent the second surface opposite the first projection such that, in the first plane, at least a portion of the second surface is positioned between the first and third projections.

13. The gripping wedge of claim 12, wherein the third projection is adapted to urge the gripping wedge to pivot about the first projection.

14. The gripping wedge of claim 1, further comprising:
a third surface adjacent to the first surface and extending in the second plane that is perpendicular to each of the first and third planes such that the third surface extends perpendicular to the first surface; and a channel formed in the third surface;
wherein the channel includes a seventh curvature extending in the first plane;
wherein the channel is adapted to receive an adhesive; and
wherein the adhesive is adapted to retain the gripping wedge within the pipe joint restraint.

15. A restraint apparatus for a pipe joint, the restraint apparatus comprising:
a joint restraint comprising a housing;
a fastener engaged with the joint restraint, the fastener comprising a distal end portion adapted to be received within the housing of the joint restraint; and
a gripping wedge received within the housing of the joint restraint and adapted to be engaged by the distal end portion of the fastener;
wherein the gripping wedge comprises:
a first surface;
a groove formed in the first surface, the groove having first and second curvatures;
wherein the first curvature extends in a first plane;
wherein the second curvature extends in a second plane; and
wherein the second plane is perpendicular to the first plane;
a projection at least a portion of which is offset from the first surface;
wherein the projection is adjacent the groove so that at least a portion of the groove is positioned between the projection and the first surface;
wherein the projection has a third curvature;
wherein the third curvature of the projection is coaxial with the first curvature of the groove; and
wherein the projection is adapted to dig into a pipe being restrained by the restraint apparatus; and
an inclined ledge opposing the first surface in the first plane and adapted to be engaged by the distal end portion of the fastener;
wherein the inclined ledge defines a fourth curvature, the fourth curvature extending within the second plane; and
wherein the inclined ledge, including the fourth curvature, permits the gripping wedge to pivot, about the distal end portion of the fastener as the projection digs into the pipe being restrained by the restraint apparatus, and prevents, or at least resists, over-rotation of the gripping wedge.

16. The restraint apparatus of claim 15, wherein the at least a portion of the projection is radially offset from the first surface.

17. The restraint apparatus of claim 15,
wherein the first surface extends in a third plane that is perpendicular to each of the first and second planes; and
wherein the at least a portion of the projection is offset from the first surface in a direction perpendicular to the first plane and in a direction perpendicular to the third plane.

18. The restraint apparatus of claim 17, wherein the at least a portion of the groove is positioned between the projection and the first surface in the third plane.

19. The restraint apparatus of claim 17,
wherein the projection further includes a fifth curvature; and
wherein the fifth curvature of the projection extends in the third plane.

20. The restraint apparatus of claim 15, wherein the at least a portion of the groove is positioned between the projection and the first surface in the second plane.

\* \* \* \* \*